US011869535B1

(12) United States Patent
Bahadori et al.

(10) Patent No.: US 11,869,535 B1
(45) Date of Patent: Jan. 9, 2024

(54) CHARACTER-LEVEL EMOTION DETECTION

(71) Applicant: Amazon Technologies, Inc., Seattle, WA (US)

(72) Inventors: Mohammad Taha Bahadori, Vancouver (CA); Viktor Rozgic, Belmont, MA (US); Alexander Jonathan Pinkus, Seattle, WA (US); Chao Wang, Newton, MA (US); David Heckerman, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 245 days.

(21) Appl. No.: 16/711,883

(22) Filed: Dec. 12, 2019

(51) Int. Cl.

| | |
|---|---|
| ***G10L 25/63*** | (2013.01) |
| ***G10L 15/22*** | (2006.01) |
| ***G10L 15/16*** | (2006.01) |
| ***G10L 15/06*** | (2013.01) |
| ***G06N 3/04*** | (2023.01) |
| ***G06N 3/08*** | (2023.01) |
| ***G10L 15/18*** | (2013.01) |
| ***G06N 3/044*** | (2023.01) |

(52) U.S. Cl.
CPC .............. *G10L 25/63* (2013.01); *G06N 3/044* (2023.01); *G06N 3/08* (2013.01); *G10L 15/063* (2013.01); *G10L 15/16* (2013.01); *G10L 15/1815* (2013.01); *G10L 15/22* (2013.01); *G10L 2015/223* (2013.01)

(58) Field of Classification Search
CPC ....... G10L 25/63; G10L 15/063; G10L 15/16; G10L 15/1815; G10L 15/22; G10L 2015/223; G06N 3/0445; G06N 3/08
See application file for complete search history.

(56) References Cited

U.S. PATENT DOCUMENTS

| | | | | |
|---|---|---|---|---|
| 2018/0089834 | A1* | 3/2018 | Spizhevoy | G06K 9/0061 |
| 2018/0197098 | A1* | 7/2018 | Subbian | G06Q 50/01 |
| 2020/0042799 | A1* | 2/2020 | Huang | G06K 9/6262 |
| 2020/0151088 | A1* | 5/2020 | Gu | G06F 30/343 |
| 2020/0272806 | A1* | 8/2020 | Walker | G06K 9/6271 |
| 2020/0410675 | A1* | 12/2020 | Wang | A61B 5/7267 |
| 2021/0074285 | A1* | 3/2021 | Golikov | G01D 21/02 |
| 2021/0142782 | A1* | 5/2021 | Wolf | G06N 3/04 |
| 2021/0151058 | A1* | 5/2021 | Cheung | G02B 27/0093 |
| 2021/0357630 | A1* | 11/2021 | Shaevitz | G06K 9/6267 |

(Continued)

FOREIGN PATENT DOCUMENTS

KR 20200028767 A * 3/2020

OTHER PUBLICATIONS

KR20200028767A—Translation (Year: 2018).*

(Continued)

*Primary Examiner* — Bhavesh M Mehta
*Assistant Examiner* — Darioush Agahi
(74) *Attorney, Agent, or Firm* — Athorus, PLLC

(57) ABSTRACT

Described is a system and method that determines character sequences from speech, without determining the words of the speech, and processes the character sequences to determine sentiment data indicative of emotional state of a user that output the speech. The emotional state may then be presented or provided as an output to the user.

23 Claims, 12 Drawing Sheets

(56) References Cited

U.S. PATENT DOCUMENTS

2022/0059122 A1* 2/2022 Xiu .......................... G10L 17/04

OTHER PUBLICATIONS

Jan Chorowski, Navdeep Jaitly Towards better decoding and language model integration in sequence to sequence models Google Brain Dec. 2016 (Year: 2016).*
Aguilar, G., et al., "Multimodal and Multi-view Models for Emotion Recognition," in ACL, 2019, https://www.aclweb.org/anthology/P19-1095.pdf, 12 pages.
Ba, J. L., et al., "Layer Normalization," in NIPS Deep Learning Symposium, 2016, https://arxiv.org/pdf/1607.06450.pdf, 14 pages.
Bergstra, J. and Bengio, Y., "Random Search for Hyper-Parameter Optimization," JMLR, 2012, http://jmlr.csail.mit.edu/papers/volume13/bergstra12a/bergstra12a.pdf, 25 pages.
Busso, C., et al., "IEMOCAP: Interactive Emotional Dyadic Motion Capture Database," Language Resources and Evaluation, Kluwer Academic Publishers, 2008, https://sail.usc.edu/publications/files/BussoLRE2008.pdf, 30 pages.
Devlin, J., et al., "BERT: Pre-training of Deep Bidirectional Transformers for Language Understanding," in HLT, 2019, https://www.aclweb.org/anthology/N19-1423.pdf, 16 pages.
Dhingra, B., et al., "Tweet2Vec: Character-Based Distributed Representations for Social Media," in ACL, 2016, https://www.cs.cmu.edu/~wcohen/postscript/acl-2016-bd.pdf, 6 pages.
Graves, A., et al., "Connectionist Temporal Classification: Labelling Unsegmented Sequence Data with Recurrent Neural Networks," in ICML, 2006, https://www.cs.toronto.edu/~graves/icml_2006.pdf, 8 pages.
Greedy Decoder, https://www.tensorflow.org/api_docs/python/tf/nn/ctc_greedy_decoder, (downloaded Jun. 14, 2017, by web.archive.org).
He, K., et al., "Deep Residual Learning for Image Recognition," in CVPR, 2016, http://openaccess.thecvf.com/content_cvpr_2016/papers/He_Deep_Residual_Learning_CVPR_2016_paper.pdf, 9 pages.
Hochreiter, S. and Schmidhuber, J., "Long Short-Term Memory," Neural Computation, vol. 9, No. 8, pp. 1735-1780, 1997, https://www.researchgate.net/profile/Sepp_Hochreiter/publication/13853244_Long_Short-term_Memory/links/5700e75608aea6b7746a0624/Long-Short-term-Memory.pdf?origin=publication_detail,33 pages.
Lakomkin, E., et al., "Incorporating End-To-End Speech Recognition Models For Sentiment Analysis," in ICRA, 2019, https://arxiv.org/pdf/1902.11245.pdf, 7 pages.
Lin, L. I-K., "A Concordance Correlation Coefficient to Evaluate Reproducibility," Biometrics, 1989, https://pdfs.semanticscholar.org/1527/ba83e2656b0427052b5209c0470affa318ef.pdf?_ga=2.221014936.1226002713.1582334499-1985355348.1527123823, 14 pages.
Liu, Z., et al., "Entity Recognition from Clinical Texts via Recurrent Neural Network," BMC Medical Informatics and Decision Making, 2017, https://bmcmedinformdecismak.biomedcentral.com/track/pdf/10.1186/s12911-017-0468-7, 9 pages.
Lotfian, R. and Busso, C., "Building Naturalistic Emotionally Balanced Speech Corpus by Retrieving Emotional Speech from Existing Podcast Recordings," IEEE Transactions on Affective Computing, 2017, 13 pages.
Lu, Z. et al., Speech Sentiment Analysis via Pre-Trained Features from End-to-End ASR Models, Computation and Language (cs.CL); Machine Learning (cs.LG); Audio and Speech Processing (eess.AS), 5 pages, https://arxiv.org/pdf/1911.09762.pdf.
Metze, F., et al., "Emotion Recognition using Imperfect Speech Recognition," in Interspeech, 2010, http://www.cs.cmu.edu/~fmetze/interACT/Publications_files/publications/emo-asr_is.pdf, 4 pages.
Miao, Y., et al., "EESEN: End-To-End Speech Recognition Using Deep Rnn Models and WFST-Based Decoding," in ASRU, 2015, http://www.cs.cmu.edu/~fmetze/interACT/Publications_files/publications/eesenasru.pdf, 8 pages.
Neto, J., et al., "Speaker-Adaptation for Hybrid Hmm-Ann Continuous Speech Recognition System," in Eurospeech, 1995, https://www.researchgate.net/profile/Ciro_Martins/publication/2421983_Speaker-Adaptation_For_Hybrid_Hmm-Ann_Continuous_Speech_Recognition_System/links/0c9605186c6a9dcde0000000/Speaker-Adaptation-For-Hybrid-Hmm-Ann-Continuous-Speech-Recognition-System.pdf?origin=publication_detail, 5 pages.
Pandit, V. and Schuller, B., "On Many-To-Many Mapping Between Concordance Correlation Coefficient snd Mean Square Error," arXiv:1902.05180, 2019, https://arxiv.org/pdf/1902.05180.pdf.
Preoţiuc-Pietro, D., et al., "Modelling Valence and Arousal in Facebook Posts," in WASSA, 2016, http://wwbp.org/papers/va16wassa.pdf, 7 pages.
Radford, A., "Learning to Generate Reviews and Discovering Sentiment," arXiv:1704.01444, 2017, https://arxiv.org/ pdf/1704.01444.pdf, 9 pages.
Rozgić, V., et al., "Emotion Recognition Using Acoustic and Lexical Features," in Interspeech, 2012, https://pdfs.semanticscholar.org/5259/39fff6c81b18a8fab3e502d61c6b909a8a95.pdf?_ga=2.28666044.1226002713.1582334499-1985355348.1527123823, 4 pages.
Rozgic, V., et al., "Multi-Modal Prediction of PTSD and Stress Indicators," in ICASSP, 2014, 5 pages.
Schuller, B., et al., "Emotion Recognition from Speech: Putting ASR in the Loop," in ICASSP, 2009, https://www.researchgate.net/profile/Anton_Batliner/publication/224929707_Emotion_Recognition_from_Speech_Putting_ASR_in_the_Loop/links/0fcfd50f6bb1a766a1000000/Emotion-Recognition-from-Speech-Putting-ASR-in-the-Loop.pdf?origin=publication_detail, 5 pages.
Schuller, B.W., "Speech Emotion Recognition," Communications of the ACM, vol. 61, No. 5, pp. 90-99, 2018, 10 pages.
Seyeditabari, A., et al., "Emotion Detection in Text: A Review," arXiv:1806.00674, 2018, https://arxiv.org/pdf/1806.00674.pdf, 14 pages.
Stuhlsatz, A., et al., "Deep Neural Networks for Acoustic Emotion Recognition: Raising the Benchmarks," in ICASSP, 2011, https://mediatum.ub.tum.de/doc/1107313/file.pdf, 4 pages.
Xiao, Y. and Cho, K., "Efficient Character-Level Document Classification By Combining Convolution and Recurrent Layers," arXiv:1602.00367, 2016, https://arxiv.org/pdf/1602.00367.pdf, 10 pages.
Yao, K., et al., "Adaptation of Context-Dependent Deep Neural Networks for Automatic Speech Recognition," in SLT, 2012, https://www.microsoft.com/en-us/research/wp-content/uploads/2016/02/0000366.pdf, 4 pages.
Yoon, S., et al., "Multimodal Speech Emotion Recognition Using Audio and Text," in SLT, 2018, https://arxiv.org/pdf/1810.04635.pdf, 7 pages.
Zhang, B., et al., "Exploiting Acoustic and Lexical Properties of Phonemes to Recognize Valence from Speech," in ICASSP, 2019, http://web.eecs.umich.edu/~emilykmp/EmilyPapers/2019_Zhang_ICASSP.pdf, 5 pages.
Zhang, X., et al., "Character-level Convolutional Networks for Text Classification," in NIPS, 2015, http://papers.nips.cc/paper/5782-character-level-convolutional-networks-for-text-classification.pdf, 9 pages.

* cited by examiner

CHARACTER-LEVEL EMOTION DETECTION

BACKGROUND

Participants in a conversation may be affected by the emotional state of one another as perceived by their voice. For example, if a speaker is excited, a listener may perceive that excitement in their speech. However, a speaker may not be aware of the emotional state that may be perceived by others as conveyed by their speech. A speaker may also not be aware of how their other activities affect the emotional state as conveyed by their speech. For example, a speaker may not realize a trend that their speech sounds irritable to others on days following a restless night.

DETAILED DESCRIPTION

Figure 1:
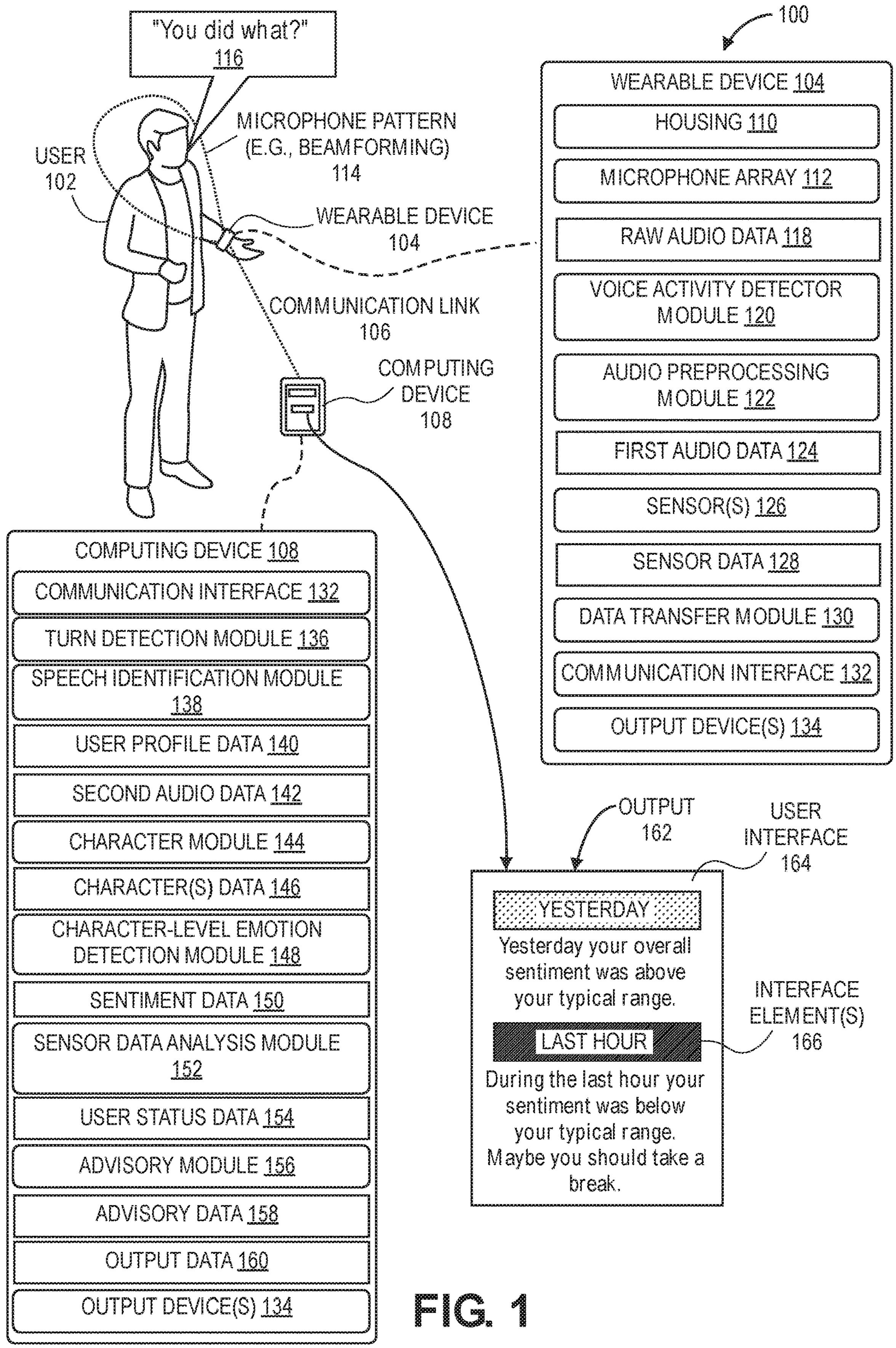
FIG. 1 is an illustrative system that processes speech of a user to determine sentiment data that is indicative of an emotional state as conveyed by the speech and presenting output related to that sentiment data, in accordance with described implementations.

A person's wellbeing and emotional state are interrelated. A poor emotional state can directly impact a person's health, just as an illness or other health event may impact a person's emotional state. A person's emotional state may also impact others with which they communicate. For example, a person who speaks with someone in an angry tone may produce in that listener an anxious emotional response.

Information about the emotional state that an individual is expressing may be useful to helping that individual. Continuing with the earlier example, if the angry person is speaking to their friend, the friend may let them know. With that awareness, the angry person may then be able to modify their behavior. As useful as this feedback is, it is infeasible to have a friend constantly present who is able to tell a person the emotional state expressed in their voice.

Described in this disclosure is a system and method that processes characters to determine sentiment data indicative of emotional state and present output in a user interface to the user regarding the user's emotional state. For example, speech or audio data generated by a user may be received and converted into characters, such as the characters of the words spoken by the individual. As discussed further below, character determination from audio may be generated without actually determining the words conveyed in that audio.

Characters may then be further processed to determine sentiment data corresponding to an emotion of the individual. In another example, characters from texts or other character based messaging generated by the user may also be processed to determine sentiment data corresponding to an emotional state of the user.

The user may authorize the system to process their speech and/or other messaging. For example, the user may enroll in the use, and consent to acquisition and processing of audio of the user speaking. Raw audio data as acquired from one or more microphones is processed to generate character data from the audio data, the character data including characters determined from the audio data. The character data is then processed to determine sentiment data corresponding to an emotional state of the user. In some implementations, the system may discard audio data that is not associated with the particular user and generate the character data from the audio data that is associated with the particular user. After the character data is generated, the audio data of the particular user may be discarded.

A wearable device and/or other portable device of the user may be used to acquire the raw audio. For example, the wearable device may comprise a band, bracelet, necklace, earring, brooch, and so forth. The wearable device may comprise one or more microphones and a computing device. The wearable device may be in communication with another device, such as a smartphone. The wearable device may provide audio data to the smartphone for processing. In other implementations, the wearable device may perform some or all of the processing discussed herein. In still other examples, the smartphone or other device may record the raw audio and process the audio data, as discussed herein. In other implementations, the functionality of the system as described may be provided by a single device or distributed across other devices. For example, a server may be accessible via a network to provide some functions that are described herein.

The sentiment data is determined by analyzing characteristics of the user's speech as expressed in the audio feature data. Changes over time in pitch, pace, and so forth may be indicative of various emotional states. For example, the emotional state of speech that is described as "excited" may correspond to speech which has a greater pace while slower paced speech is described as "bored." In another example, an increase in average pitch may be indicative of an emotional state of "angry" while an average pitch that is close to a baseline value may be indicative of an emotional state of "calm." Various techniques may be used individually or in combination to determine the sentiment data including, but not limited to, signal analysis techniques, classifiers, neural networks, and so forth. The sentiment data may be provided as numeric values, vectors, associated words, and so forth.

The sentiment data produced from the audio data of the user may be used to provide output. For example, the output may comprise a graphical user interface (GUI), a voice user interface, an indicator light, a sound, and so forth that is presented to a user by an output device. Continuing with the example, the sentiment data may comprise a GUI presented on a display of the phone that shows an indication of the user's tone or overall emotional state as conveyed by their voice based on audio data sampled from the previous 15 minutes. This indication may be a numerical value, chart, or particular color. For example, the sentiment data may comprise various values that are used to select a particular color. An element on the display of the phone or a multi-color light emitting diode on the wearable device may be operated to output that particular color, providing the user with an indication of what emotional state their voice appears to be conveying.

The output may be indicative of sentiment data over various spans of time, such as the past few minutes, during the last scheduled appointment, during the past day, and so forth. The sentiment data may be based on audio acquired from conversations with others, the user talking to themselves, or a combination. As a result, the user may be able to better assess and modify their overall mood, behavior, and interactions with others. For example, the system may alert the user when the sound of their speech indicates they are in an excitable state, giving them the opportunity to calm down.

The system may use the sentiment data and the user status data to provide advisories. For example, the user status data may include information such as hours of sleep, heart rate, number of steps taken, and so forth. The sentiment data and sensor data acquired over several days may be analyzed and used to determine that when the user status data indicates a night with greater than 7 hours of rest, the following day the sentiment data indicates the user is more agreeable and less irritable. The user may then be provided with output in a user interface that is advisory, suggesting the user get more rest. These advisories may help a user to regulate their activity, provide feedback to make healthy lifestyle changes, and maximize the quality of their health.

FIG. 1 is an illustrative system 100 that processes speech of a user to determine sentiment data that is indicative of an emotional state as conveyed by the speech and presenting output related to that sentiment data, according to one implementation.

The user 102 may have one or more wearable devices 104 on or about their person. The wearable device 104 may be implemented in various physical form factors including, but not limited to, the following: hats, headbands, necklaces, pendants, brooches, armlets, brassards, bracelets, wristbands, and so forth. In this illustration, the wearable device 104 is depicted as a wristband.

The wearable device 104 may use a communication link 106 to maintain communication with a computing device 108. For example, the computing device 108 may include a phone, tablet computer, personal computer, server, internet enabled device, voice activated device, smart-home device, and so forth. The communication link 106 may implement at least a portion of the Bluetooth Low Energy specification.

The wearable device 104 includes a housing 110. The housing 110 comprises one or more structures that support a microphone array 112. For example, the microphone array 112 may comprise two or more microphones arranged to acquire sound from ports at different locations through the housing 110. As described below, a microphone pattern 114 may provide gain or directivity using a beamforming algorithm. Speech 116 by the user 102 or other sources within range of the microphone array 112 may be detected by the microphone array 112 and raw audio data 118 may be acquired. In other implementations raw audio data 118 may be acquired from other devices.

A voice activity detector module 120 may be used to process the raw audio data 118 and determine if speech 116 is present. For example, the microphone array 112 may obtain raw audio data 118 that contains ambient noises such as traffic, wind, and so forth. Raw audio data 118 that is not deemed to contain speech 116 may discarded. Resource consumption is minimized by discarding raw audio data 118 that does not contain speech 116. For example, power consumption, demands for memory and computational resources, communication bandwidth, and so forth are minimized by limiting further processing of raw audio data 118 determined to not likely contain speech 116.

The voice activity detector module 120 may use one or more techniques to determine voice activity. For example, characteristics of the signals present in the raw audio data 118 such as frequency, energy, zero-crossing rate, and so forth may be analyzed with respect to threshold values to determine characteristics that are deemed likely to be human speech.

Once at least a portion of the raw audio data 118 has been determined to contain speech 116, an audio preprocessing module 122 may further process this portion to determine first audio data 124. In some implementations, the audio preprocessing module 122 may apply one or more of a beamforming algorithm, noise reduction algorithms, filters, and so forth to determine the first audio data 124. For example, the audio preprocessing module 122 may use a beamforming algorithm to provide directivity or gain and improve the signal to noise ratio (SNR) of the speech 116 from the user 102 with respect to speech 116 or noise from other sources.

The wearable device 104 may include one or more sensors 126 that generate sensor data 128. For example, the sensors 126 may include accelerometers, pulse oximeters, and so forth. The sensors 126 are discussed in more detail with regard to FIG. 2.

The audio preprocessing module 122 may use information from one or more sensors 126 during operation. For example, sensor data 128 from an accelerometer may be used to determine orientation of the wearable device 104. Based on the orientation, the beamforming algorithm may be operated to provide a microphone pattern 114 that includes a location where the user's 102 head is expected to be.

A data transfer module 130 may use a communication interface 132 to send the first audio data 124, sensor data 128, or other data to the computing device 108 using the communication link 106. For example, the data transfer module 130 may determine that a memory within the wearable device 104 has reached a predetermined quantity of stored first audio data 124. The communication interface 132 may comprise a Bluetooth Low Energy device that is operated responsive to commands from the data transfer module 130 to send the stored first audio data 124 to the computing device 108.

In some implementations, the first audio data 124 may be encrypted prior to transmission over the communication link 106. The encryption may be performed prior to storage in the memory of the wearable device 104, prior to transmission via the communication link 106, or both.

Communication between the wearable device 104 and the computing device 108 may be persistent or intermittent. For example, the wearable device 104 may determine and store first audio data 124 even while the communication link 106 to the computing device 108 is unavailable. At a later time, when the communication link 106 is available, the first audio data 124 may be sent to the computing device 108.

The wearable device 104 may include one or more output devices 134. For example, the output devices 134 may include a light emitting diode, haptic output device, speaker, and so forth. The output devices 134 are described in more detail with regard to FIG. 2.

The computing device 108 may include a communication interface 132. For example, the communication interface 132 of the computing device 108 may comprise a Bluetooth Low Energy device, a Wi-Fi network interface device, and so forth. The computing device 108 receives the first audio data 124 from the wearable device 104 via the communication link 106.

The computing device 108 may use a turn detection module 136 to determine that portions of the first audio data 124 are associated with different speakers. For example, when more than one person is speaking a "turn" is a contiguous portion of speech by a single person. A first turn may include several sentences spoken by a first person, while a second turn includes a response by the second person. The turn detection module 136 may use one or more characteristics in the first audio data 124 to determine that a turn has taken place. For example, a turn may be detected based on a pause in speech 116, change in pitch, change in signal amplitude, and so forth. For example, if the pause between words exceeds 350 milliseconds, data indicative of a turn may be determined. In other examples, the pause may be greater or less than 350 milliseconds.

In some implementations the turn detection module 136 may process segments of the first audio data 124 to determine if the person speaking at the beginning of the segment is the same as the person speaking at the end. The first audio data 124 may be divided into segments and subsegments. For example, each segment may be six seconds long with a first subsegment that includes a beginning two seconds of the segment and a second subsegment that includes the last two seconds of the segment. The data in the first subsegment is processed to determine a first set of features and the data in the second subsegment is processed to determine a second set of features. Segments may overlap, such that at least some data is duplicated between successive segments. If the first set of features and the second set of features are determined to be within a threshold value of one another, they may be deemed to have been spoken by the same person. If the first set of features and the second set of features are not within the threshold value of one another, they may be deemed to have been spoken by different people. A segment that includes speech from two different people may be designated as a break between one speaker and another. In this implementation, those breaks between speakers may be used to determine the boundaries of a turn. For example, a turn may be determined to begin and end when a segment includes speech from two different people.

In some implementations the turn detection module 136 may operate in conjunction with, or as part of, a speech identification module 138, as described below. For example, if the speech identification module 138 identifies that a first segment is spoken by a first user and a second segment is spoken by a second user, data indicative of a turn may be determined.

The speech identification module 138 may access user profile data 140 to determine if the first audio data 124 is associated with the user 102. For example, user profile data 140 may comprise information about speech 116 provided by the user 102 during an enrollment process. During enrollment, the user 102 may provide a sample of their speech 116 which is then processed to determine features that may be used to identify if speech 116 is likely to be from that user 102.

The speech identification module 138 may process at least a portion of the first audio data 124 that is designated as a particular turn to determine if the user 102 is the speaker. For example, the first audio data 124 of the first turn may be processed by the speech identification module 138 to determine a confidence level of 0.97 that the first turn is the user 102 speaking. A threshold confidence value of 0.95 may be specified. Continuing the example, the first audio data 124 of the second turn may be processed by the speech identification module 138 that determines a confidence level of 0.17 that the second turn is the user 102 speaking.

Second audio data 142 is determined that comprises the portion(s) of the first audio data 124 that is determined to be speech 116 from the user 102. For example, the second audio data 142 may consist of the speech 116 which exhibits a confidence level greater than the threshold confidence value of 0.95. As a result, the second audio data 142 omits speech 116 from other sources, such as someone who is in conversation with the user 102.

A character module 144 uses the second audio data 142 to determine character data 146 from the second audio data 142. For example, the character module 144 may use one or more systems such as signal analysis, classifiers, neural networks, and so forth to generate the character data 146. The character data 146 may comprise values, vectors, and so forth. For example, the character module 144 may use a convolutional neural network that accepts as input the second audio data 142 and provides as output character data that includes characters corresponding to the second audio data 142.

A character-level emotion detection ("CED") module 148, also referred to herein as a CED network, uses the character data 146 to determine sentiment data 150. Human speech involves a complex interplay of biological systems on the part of the person speaking. The character analysis module 148 determines the sentiment data 150 that is indicative of a possible emotional state of the user 102 based on the character data 146. The character module 148 may determine various values that are deemed to be representative of emotional state.

As discussed herein, use of character data and the described CED network reduces computation requirements and also avoids the need for an analysis of the words spoken and/or their meaning. For example, the described implementations do not need an automated speech recognition (ASR) system to determine the text of the spoken words.

The sentiment data 150 determined by the character module 148 may be expressed as one or more numeric values, vectors, words, and so forth. For example, the sentiment data 150 may comprise a composite single value, such as a numeric value, color, and so forth. For example, a weighted sum of the valence, activation, and dominance values may be used to generate an overall sentiment index or "tone value" or "mood value." In another example, the sentiment data 150 may comprise one or more vectors in an n-dimensional space. In yet another example, the sentiment data 150 may comprise associated words that are determined by particular combinations of other values, such as valence, activation, and dominance values. The sentiment data 150 may comprise values that are non-normative. For example, a sentiment value that is expressed as a negative number may not be representative of an emotion that is considered to be bad.

The computing device 108 may include a sensor data analysis module 152. The sensor data analysis module 152 may process the sensor data 128 and generate user status data 154. For example, the sensor data 128 obtained from sensors 126 on the wearable device 104 may comprise information about movement obtained from an accelerometer, pulse rates obtained from a pulse oximeter, and so forth. The user status data 154 may comprise information such as total movement by the wearable device 104 during particular time intervals, pulse rates during particular time intervals, and so forth. The user status data 154 may provide information that is representative of the physiological state of the user 102.

An advisory module 156 may use the sentiment data 150 and the user status data 154 to determine advisory data 158. The sentiment data 150 and the user status data 154 may each include timestamp information. Sentiment data 150 for a first time period may be associated with user status data 154 for a second time period. Historical data may be used to determine trends. These trends may then be used by the advisory module 156 to determine advisory data 158. For example, trend data may indicate that when the user status data 154 indicates that the user 102 sleeps for fewer than 7 hours per night, the following day their overall tone value is below their personal baseline value. As a result, the advisory module 156 may generate advisory data 158 to inform the user 102 of this and suggest more rest.

In some implementations the advisory data 158 may include speech recommendations. These speech recommendations may include suggestions as to how the user 102 may manage their speech to change or moderate the apparent emotion presented by their speech. In some implementations, the speech recommendations may advise the user 102 to speak more slowly, pause, breath more deeply, suggest a different tone of voice, and so forth. For example, if the sentiment data 150 indicates that the user 102 appears to have been upset, the advisory data 158 may be for the user 102 to stop speaking for ten seconds and then continue speaking in a calmer voice. In some implementations the speech recommendations may be associated with particular goals. For example, the user 102 may wish to sound more assertive and confident. The user 102 may provide input that indicates these goals, with that input used to set minimum threshold values for use by the advisory module 156. The advisory module 156 may analyze the sentiment data 150 with respect to these minimum threshold values to provide the advisory data 158. Continuing the example, if the sentiment data 150 indicates that the speech of the user 102 was below the minimum threshold values, the advisory data 158 may inform the user 102 and may also suggest actions.

The computing device 108 may generate output data 160 from one or more of the sentiment data 150 or the advisory data 158. For example, the output data 160 may comprise hypertext markup language (HTML) instructions that, when processed by a browser engine, generate an image of a graphical user interface (GUI). In another example, the output data 160 may comprise an instruction to play a particular sound, operate a buzzer, or operate a light to present a particular color at a particular intensity.

The output data 160 may then be used to operate one or more output devices 134. Continuing the examples, the GUI may be presented on a display device, a buzzer may be operated, the light may be illuminated, and so forth to provide output 162. The output 162 may include a user interface 164, such as the GUI depicted in FIG. 1 that provides information about the sentiment for yesterday and the previous hour using several interface elements 166. In this example, the sentiment is presented as an indication with respect to a typical range of sentiment associated with the user 102. In some implementations the sentiment may be expressed as numeric values and interface elements 166 with particular colors associated with those numeric values may be presented in the user interface. For example, if the sentiment of the user 102 has one or more values that exceed the user's 102 typical range for a metric associated with being happy, an interface element 166 colored green may be presented. In contrast, if the sentiment of the user 102 has one or more values that are below the user's 102 typical range, an interface element 166 colored blue may be presented. The typical range may be determined using one or more techniques. For example, the typical range may be based on minimum sentiment values, maximum sentiment values, may be specified with respect to an average or linear regression line, and so forth.

The system may provide output 162 based on data obtained over various time intervals. For example, the user interface 164 illustrates sentiment for yesterday and the last hour. The system 100 may present information about sentiment associated with other periods of time. For example, the sentiment data 150 may be presented on a real time or near-real time basis using raw audio data 118 obtained in the last n seconds, where n is greater than zero.

It is understood that the various functions, modules, and operations described in this system 100 may be performed by other devices. For example, the advisory module 156 may execute on a server.

Figure 2:
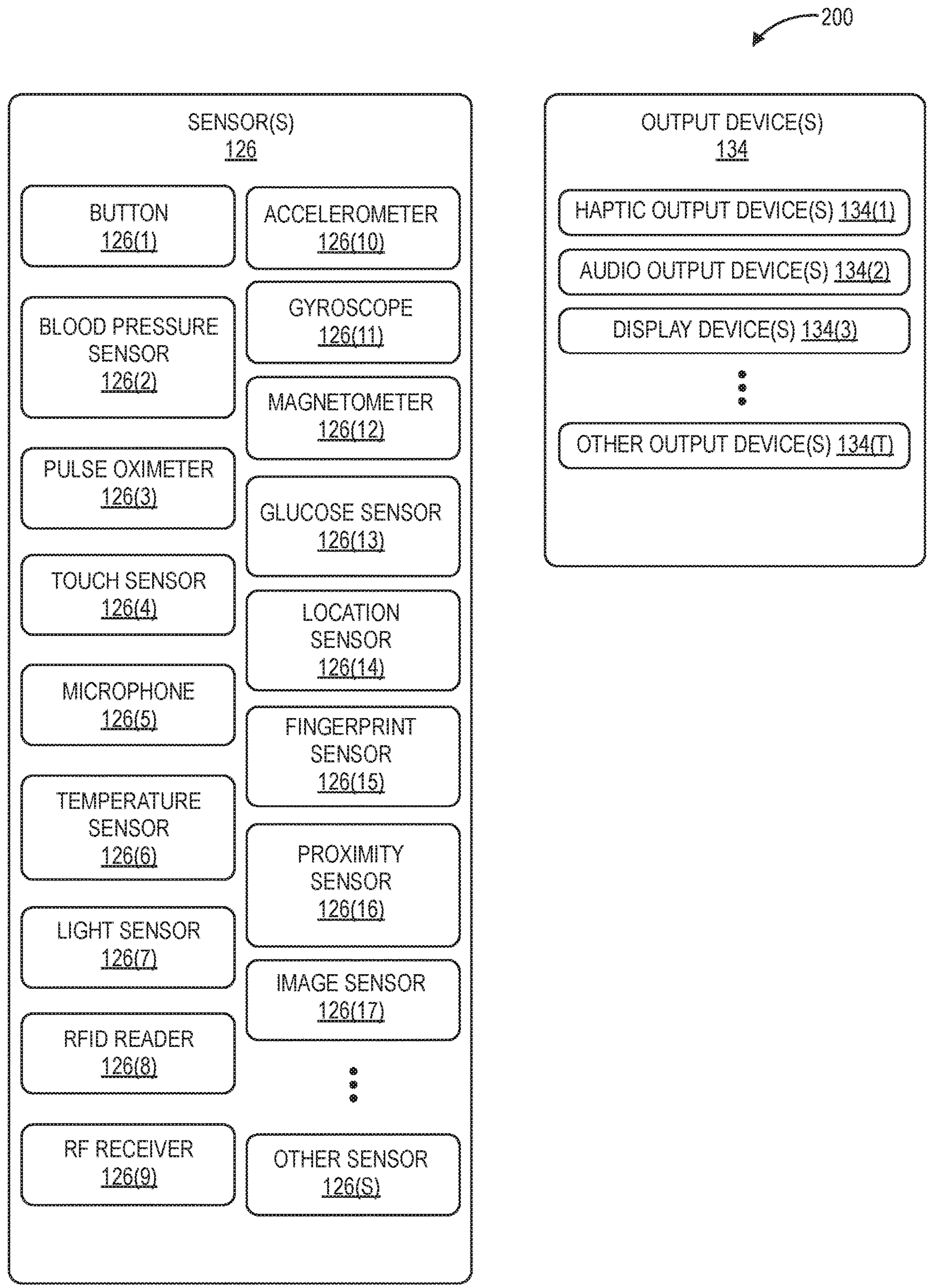
FIG. 2 illustrates a block diagram of sensors and output devices that may be used during operation of the system, in accordance with described implementations.

FIG. 2 illustrates a block diagram 200 of sensors 126 and output devices 134 that may be used by the wearable device 104, the computing device 108, or other devices during operation of the system 100, according to one implementation. As described above with regard to FIG. 1, the sensors 126 may generate sensor data 128.

The one or more sensors 126 may be integrated with or internal to a computing device, such as the wearable device 104, the computing device 108, and so forth. For example, the sensors 126 may be built-in to the wearable device 104 during manufacture. In other implementations, the sensors 126 may be part of another device. For example, the sensors 126 may comprise a device external to, but in communication with, the computing device 108 using Bluetooth, Wi-Fi, 3G, 4G, LTE, ZigBee, Z-Wave, or another wireless or wired communication technology.

The one or more sensors 126 may include one or more buttons 126(1) that are configured to accept input from the user 102. The buttons 126(1) may comprise mechanical, capacitive, optical, or other mechanisms. For example, the buttons 126(1) may comprise mechanical switches configured to accept an applied force from a touch of the user 102 to generate an input signal. In some implementations, input from one or more sensors 126 may be used to initiate acquisition of the raw audio data 118. For example, activation of a button 126(1) may initiate acquisition of the raw audio data 118.

A blood pressure sensor 126(2) may be configured to provide sensor data 128 that is indicative of the user's 102 blood pressure. For example, the blood pressure sensor 126(2) may comprise a camera that acquires images of blood vessels and determines the blood pressure by analyzing the changes in diameter of the blood vessels over time. In another example, the blood pressure sensor 126(2) may comprise a sensor transducer that is in contact with the skin of the user 102 that is proximate to a blood vessel.

A pulse oximeter 126(3) may be configured to provide sensor data 128 that is indicative of a cardiac pulse rate and data indicative of oxygen saturation of the user's 102 blood. For example, the pulse oximeter 126(3) may use one or more light emitting diodes (LEDs) and corresponding detectors to determine changes in apparent color of the blood of the user 102 resulting from oxygen binding with hemoglobin in the blood, providing information about oxygen saturation. Changes over time in apparent reflectance of light emitted by the LEDs may be used to determine cardiac pulse.

The sensors 126 may include one or more touch sensors 126(4). The touch sensors 126(4) may use resistive, capacitive, surface capacitance, projected capacitance, mutual capacitance, optical, Interpolating Force-Sensitive Resistance ("IFSR"), or other mechanisms to determine the position of a touch or near-touch of the user 102. For example, the IFSR may comprise a material configured to change electrical resistance responsive to an applied force. The location within the material of that change in electrical resistance may indicate the position of the touch.

One or more microphones 126(5) may be configured to acquire information about sound present in the environment. In some implementations, a plurality of microphones 126(5) may be used to form the microphone array 112. As described above, the microphone array 112 may implement beamforming techniques to provide for directionality of gain.

A temperature sensor (or thermometer) 126(6) may provide information indicative of a temperature of an object. The temperature sensor 126(6) in the computing device may be configured to measure ambient air temperature proximate to the user 102, the body temperature of the user 102, and so forth. The temperature sensor 126(6) may comprise a silicon bandgap temperature sensor, thermistor, thermocouple, or other device. In some implementations, the temperature sensor 126(6) may comprise an infrared detector configured to determine temperature using thermal radiation.

The sensors 126 may include one or more light sensors 126(7). The light sensors 126(7) may be configured to provide information associated with ambient lighting conditions such as a level of illumination. The light sensors 126(7) may be sensitive to wavelengths including, but not limited to, infrared, visible, or ultraviolet light. In contrast to a camera, the light sensor 126(7) may typically provide a sequence of amplitude (magnitude) samples and color data while the camera provides a sequence of two-dimensional frames of samples (pixels).

One or more radio frequency identification (RFID) readers 126(8), near field communication (NFC) systems, and so forth, may also be included as sensors 126. The user 102, objects around the computing device, locations within a building, and so forth, may be equipped with one or more radio frequency (RF) tags. The RF tags are configured to emit an RF signal. In one implementation, the RF tag may be a RFID tag configured to emit the RF signal upon activation by an external signal. For example, the external signal may comprise a RF signal or a magnetic field configured to energize or activate the RFID tag. In another implementation, the RF tag may comprise a transmitter and a power source configured to power the transmitter. For example, the RF tag may comprise a Bluetooth Low Energy ("BLE") transmitter and battery. In other implementations, the tag may use other techniques to indicate its presence. For example, an acoustic tag may be configured to generate an ultrasonic signal, which is detected by corresponding acoustic receivers. In yet another-implementation, the tag may be configured to emit an optical signal.

One or more RF receivers 126(9) may also be included as sensors 126. In some implementations, the RF receivers 126(9) may be part of transceiver assemblies. The RF receivers 126(9) may be configured to acquire RF signals associated with Wi-Fi, Bluetooth, ZigBee, Z-Wave, 3G, 4G, LTE, or other wireless data transmission technologies. The RF receivers 126(9) may provide information associated with data transmitted via radio frequencies, signal strength of RF signals, and so forth. For example, information from the RF receivers 126(9) may be used to facilitate determination of a location of the computing device, and so forth.

The sensors 126 may include one or more accelerometers 126(10). The accelerometers 126(10) may provide information such as the direction and magnitude of an imposed acceleration, tilt relative to local vertical, and so forth. Data such as rate of acceleration, determination of changes in direction, speed, tilt, and so forth, may be determined using the accelerometers 126(10).

A gyroscope 126(11) provides information indicative of rotation of an object affixed thereto. For example, the gyroscope 126(11) may indicate whether the device has been rotated.

A magnetometer 126(12) may be used to determine an orientation by measuring ambient magnetic fields, such as the terrestrial magnetic field. For example, output from the magnetometer 126(12) may be used to determine whether the device containing the sensor 126, such as the computing device 108, has changed orientation or otherwise moved. In other implementations, the magnetometer 126(12) may be configured to detect magnetic fields generated by another device.

A glucose sensor 126(13) may be used to determine a concentration of glucose within the blood or tissues of the user 102. For example, the glucose sensor 126(13) may comprise a near infrared spectroscope that determines a concentration of glucose or glucose metabolites in tissues. In another example, the glucose sensor 126(13) may comprise a chemical detector that measures presence of glucose or glucose metabolites at the surface of the user's skin.

A location sensor 126(14) is configured to provide information indicative of a location. The location may be relative or absolute. For example, a relative location may indicate "kitchen," "bedroom," "conference room," and so forth. In comparison, an absolute location is expressed relative to a reference point or datum, such as a street address, geolocation comprising coordinates indicative of latitude and longitude, grid square, and so forth. The location sensor 126 (14) may include, but is not limited to, radio navigation-based systems such as terrestrial or satellite-based navigational systems. The satellite-based navigation system may include one or more of a Global Positioning System ("GPS") receiver, a Global Navigation Satellite System ("GLONASS") receiver, a Galileo receiver, a BeiDou Navigation Satellite System ("BDS") receiver, an Indian Regional Navigational Satellite System, and so forth. In some implementations, the location sensor 126(14) may be omitted or operate in conjunction with an external resource such as a cellular network operator providing location information, or Bluetooth beacons.

A fingerprint sensor 126(15) is configured to acquire fingerprint data. The fingerprint sensor 126(15) may use an optical, ultrasonic, capacitive, resistive, or other detector to obtain an image or other representation of features of a fingerprint. For example, the fingerprint sensor 126(15) may comprise a capacitive sensor configured to generate an image of the fingerprint of the user 102.

A proximity sensor 126(16) may be configured to provide sensor data 128 indicative of one or more of a presence or absence of an object, a distance to the object, or characteristics of the object. The proximity sensor 126(16) may use optical, electrical, ultrasonic, electromagnetic, or other techniques to determine a presence of an object. For example, the proximity sensor 126(16) may comprise a capacitive proximity sensor configured to provide an electrical field and determine a change in electrical capacitance due to presence or absence of an object within the electrical field.

An image sensor 126(17) comprises an imaging element to acquire images in visible light, infrared, ultraviolet, and so forth. For example, the image sensor 126(17) may comprise a complementary metal oxide (CMOS) imaging element or a charge coupled device (CCD).

The sensors 126 may include other sensors 126(S) as well. For example, the other sensors 126(S) may include strain gauges, anti-tamper indicators, and so forth. For example, strain gauges or strain sensors may be embedded within the wearable device 104 and may be configured to provide information indicating that at least a portion of the wearable device 104 has been stretched or displaced such that the wearable device 104 may have been donned or doffed.

In some implementations, the sensors 126 may include hardware processors, memory, and other elements configured to perform various functions. Furthermore, the sensors 126 may be configured to communicate by way of a network or may couple directly with the other devices.

The computing device may include or may couple to one or more output devices 134. The output devices 134 are configured to generate signals which may be perceived by the user 102, detectable by the sensors 126, or a combination thereof.

Haptic output devices 134(1) are configured to provide a signal, which results in a tactile sensation to the user 102. The haptic output devices 134(1) may use one or more mechanisms such as electrical stimulation or mechanical displacement to provide the signal. For example, the haptic output devices 134(1) may be configured to generate a modulated electrical signal, which produces an apparent tactile sensation in one or more fingers of the user 102. In another example, the haptic output devices 134(1) may comprise piezoelectric or rotary motor devices configured to provide a vibration that may be felt by the user 102.

One or more audio output devices 134(2) are configured to provide acoustic output. The acoustic output includes one or more of infrasonic sound, audible sound, or ultrasonic sound. The audio output devices 134(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output by an audio output device 134(2).

The display devices 132(3) may be configured to provide output that may be seen by the user 102 or detected by a light-sensitive detector such as the image sensor 126(17) or light sensor 126(7). The output may be monochrome or color. The display devices 132(3) may be emissive, reflective, or both. An emissive display device 132(3), such as using LEDs, is configured to emit light during operation. In comparison, a reflective display device 132(3), such as using an electrophoretic element, relies on ambient light to present an image. Backlights or front lights may be used to illuminate non-emissive display devices 132(3) to provide visibility of the output in conditions where the ambient light levels are low.

The display mechanisms of display devices 132(3) may include, but are not limited to, micro-electromechanical systems ("MEMS"), spatial light modulators, electroluminescent displays, quantum dot displays, liquid crystal on silicon ("LCOS") displays, cholesteric displays, interferometric displays, liquid crystal displays, electrophoretic displays, LED displays, and so forth. These display mechanisms are configured to emit light, modulate incident light emitted from another source, or both. The display devices 132(3) may operate as panels, projectors, and so forth.

The display devices 132(3) may be configured to present images. For example, the display devices 132(3) may comprise a pixel-addressable display. The image may comprise at least a two-dimensional array of pixels or a vector representation of at least two-dimensional image.

In some implementations, the display devices 132(3) may be configured to provide non-image data, such as text or numeric characters, colors, and so forth. For example, a segmented electrophoretic display device 132(3), segmented LED, and so forth, may be used to present information such as letters or numbers. The display devices 132(3) may also be configurable to vary the color of the segment, such as using multicolor LED segments.

Other output devices 134(T) may also be present. For example, the other output devices 134(T) may include scent dispensers.

Figure 3:
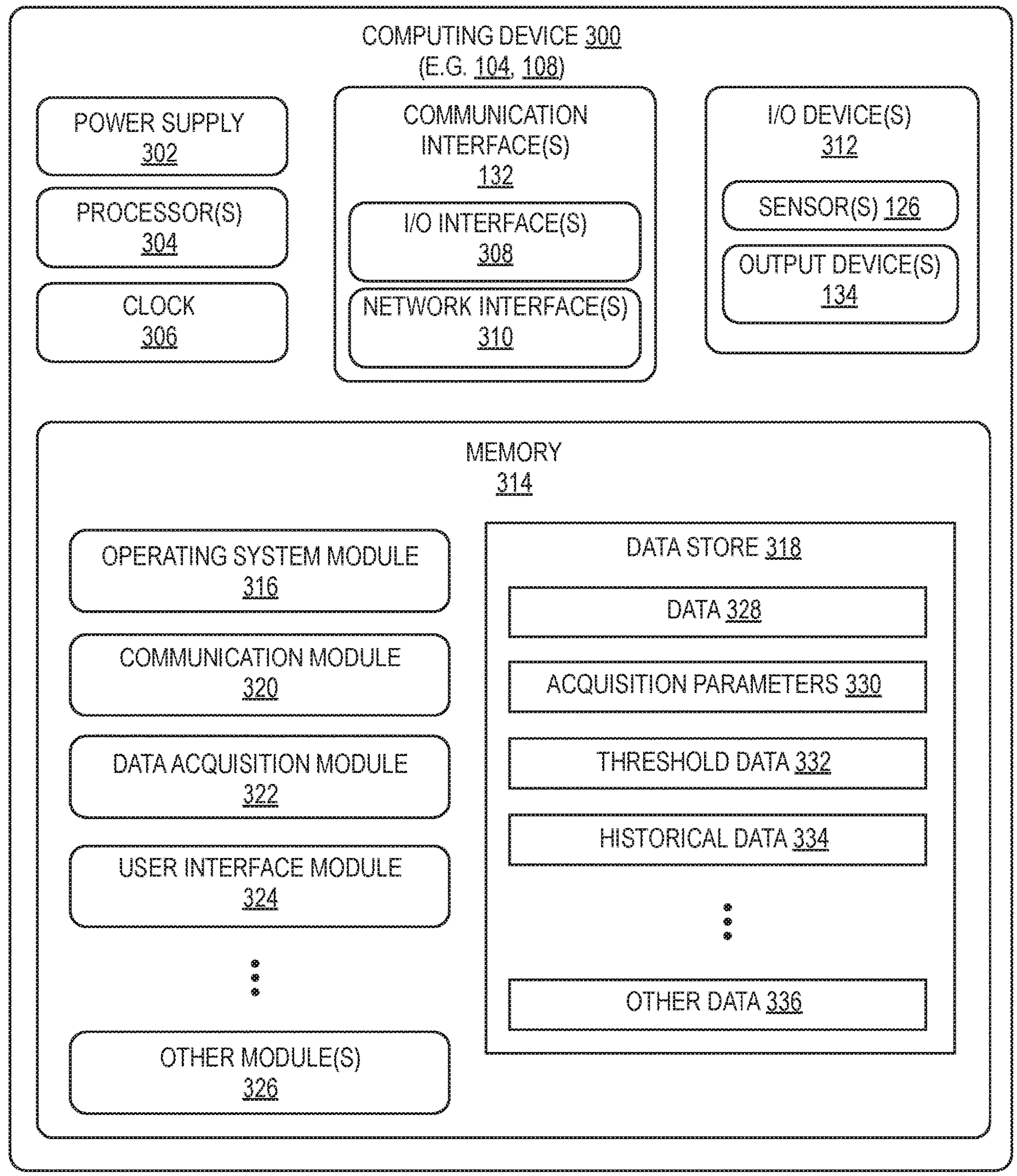
FIG. 3 illustrates a block diagram of a computing device (s) such as a wearable device, smartphone, or other devices, in accordance with described implementations.

FIG. 3 illustrates a block diagram of a computing device 300 configured to support operation of the system 100. As described above, the computing device 300 may be the wearable device 104, the computing device 108, and so forth.

One or more power supplies 302 are configured to provide electrical power suitable for operating the components in the computing device 300. In some implementations, the power supply 302 may comprise a rechargeable battery, fuel cell, photovoltaic cell, power conditioning circuitry, wireless power receiver, and so forth.

The computing device 300 may include one or more hardware processors 304 (processors) configured to execute one or more stored instructions. The processors 304 may comprise one or more cores. One or more clocks 306 may provide information indicative of date, time, ticks, and so forth. For example, the processor 304 may use data from the clock 306 to generate a timestamp, trigger a preprogrammed action, and so forth.

The computing device 300 may include one or more communication interfaces 132 such as input/output (I/O) interfaces 308, network interfaces 310, and so forth. The communication interfaces 132 enable the computing device 300, or components thereof, to communicate with other devices or components. The communication interfaces 132 may include one or more I/O interfaces 308. The I/O interfaces 308 may comprise interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 308 may couple to one or more I/O devices 312. The I/O devices 312 may include input devices such as one or more of the sensors 126. The I/O devices 312 may also include output devices 134 such as one or more of an audio output device 134(2), a display device 134(3), and so forth. In some embodiments, the I/O devices 312 may be physically incorporated with the computing device 300 or may be externally placed.

The network interfaces 310 are configured to provide communications between the computing device 300 and other devices, such as the sensors 126, routers, access devices, and so forth. The network interfaces 310 may include devices configured to couple to wired or wireless personal area networks ("PANs"), local area networks ("LANs"), wide area networks ("WANs"), and so forth. For example, the network interfaces 310 may include devices compatible with Ethernet, Wi-Fi, Bluetooth, ZigBee, 4G, 5G, LTE, and so forth.

The computing device 300 may also include one or more busses or other internal communications hardware or software that allow for the transfer of data between the various modules and components of the computing device 300.

As shown in FIG. 3, the computing device 300 includes one or more memories 314. The memory 314 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 314 provides storage of computer-readable instructions, data structures, program modules, and other data for the operation of the computing device 300. A few example functional modules are shown stored in the memory 314, although the same functionality may alternatively be implemented in hardware, firmware, or as a system on a chip (SOC).

The memory 314 may include at least one operating system (OS) module 316. The OS module 316 is configured to manage hardware resource devices such as the I/O interfaces 308, the network interfaces 310, the I/O devices 312, and provide various services to applications or modules executing on the processors 304. The OS module 316 may implement a variant of the FreeBSD operating system as promulgated by the FreeBSD Project; other UNIX or UNIX-like operating system; a variation of the Linux operating system as promulgated by Linus Torvalds; the Windows operating system from Microsoft Corporation of Redmond, Washington, USA; the Android operating system from Google Corporation of Mountain View, California, USA; the iOS operating system from Apple Corporation of Cupertino, California, USA; or other operating systems.

Also stored in the memory 314 may be a data store 318 and one or more of the following modules. These modules may be executed as foreground applications, background tasks, daemons, and so forth. The data store 318 may use a flat file, database, linked list, tree, executable code, script, or other data structure to store information. In some implementations, the data store 318 or a portion of the data store 318 may be distributed across one or more other devices including the computing devices 300, network attached storage devices, and so forth.

A communication module 320 may be configured to establish communications with one or more of other computing devices 300, the sensors 126, and so forth. The communications may be authenticated, encrypted, and so forth. The communication module 320 may also control the communication interfaces 132.

The memory 314 may also store a data acquisition module 322. The data acquisition module 322 is configured to acquire raw audio data 118, sensor data 126, and so forth. In some implementations the data acquisition module 322 may be configured to operate the one or more sensors 126, the microphone array 112, and so forth. For example, the data acquisition module 322 may determine that the sensor data 128 satisfies a trigger event. The trigger event may comprise values of sensor data 128 for one or more sensors 126 exceeding a threshold value. For example, if pulse oximeter 126(3) on the wearable device 104 indicates that the pulse of the user 102 has exceeded a threshold value, the microphone array 112 may be operated to generate raw audio data 118.

In another example, the data acquisition module 322 on the wearable device 104 may receive instructions from the computing device 108 to obtain raw audio data 118 at a specified interval, at a scheduled time, and so forth. For example, the computing device 108 may send instructions to acquire raw audio data 118 for 60 seconds every 540 seconds. The raw audio data 118 may then be processed with the voice activity detector module 120 to determine if speech 116 is present. If speech 116 is detected, the first audio data 124 may be obtained and then sent to the computing device 108.

A user interface module 324 provides a user interface using one or more of the I/O devices 312. The user interface module 324 may be used to obtain input from the user 102, present information to the user 102, and so forth. For example, the user interface module 324 may present a graphical user interface on the display device 134(3) and accept user input using the touch sensor 126(4).

One or more other modules 326, such as the voice activity detector module 120, the audio preprocessing module 122, the data transfer module 130, the turn detection module 136, the speech identification module 138, the audio feature module 144, the feature analysis module 148, the sensor data analysis module 152, the advisory module 156, and so forth may also be stored in the memory 314.

Data 328 may be stored in the data store 318. For example, the data 328 may comprise one or more of raw audio data 118, first audio data 124, sensor data 128, user profile data 140, second audio data 142, sentiment data 150, user status data 154, advisory data 158, output data 160, and so forth.

One or more acquisition parameters 330 may be stored in the memory 314. The acquisition parameters 330 may comprise parameters such as audio sample rate, audio sample frequency, audio frame size, and so forth.

Threshold data 332 may be stored in the memory 314. For example, the threshold data 332 may specify one or more thresholds used by the voice activity detector module 120 to determine if the raw audio data 118 includes speech 116.

The computing device 300 may maintain historical data 334. The historical data 334 may be used to provide information about trends or changes over time. For example, the historical data 334 may comprise an indication of sentiment data 150 on an hourly basis for the previous 90 days. In another example, the historical data 334 may comprise user status data 154 for the previous 90 days.

Other data 336 may also be stored in the data store 318.

In different implementations, different computing devices 300 may have different capabilities or capacities. For example, the computing device 108 may have significantly more processor 304 capability and memory 314 capacity compared to the wearable device 104. In one implementation, the wearable device 104 may determine the first audio data 124 and send the first audio data 124 to the computing device 108. In another implementation, the wearable device 104 may generate the sentiment data 150, advisory data 158, and so forth. Other combinations of distribution of data processing and functionality may be used in other implementations.

Figure 4:
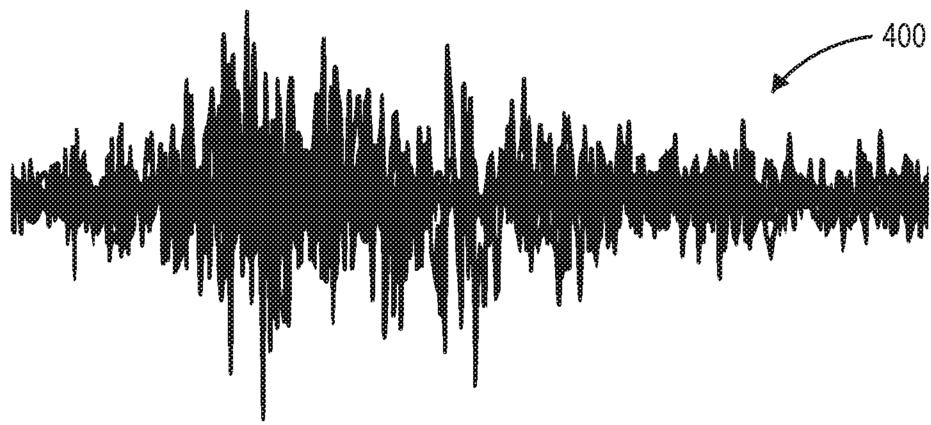
FIG. 4 illustrates a block diagram of the conversion of speech to sentiment data, in accordance with described implementations.
Figure 4:
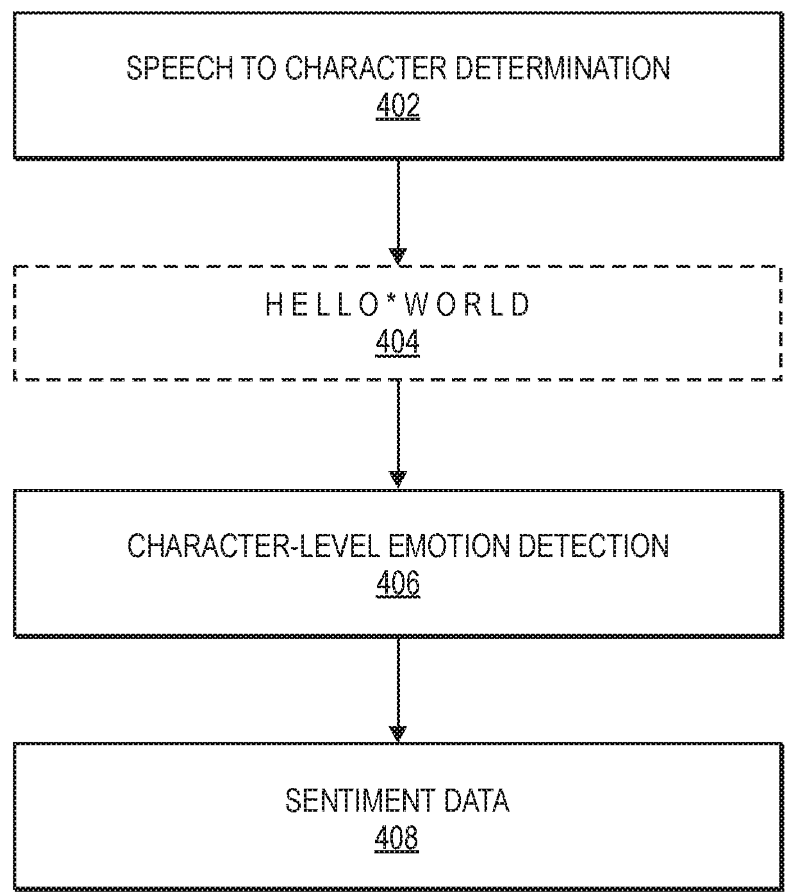

FIG. 4 illustrates a block diagram of the conversion of speech 400 to sentiment data 408, in accordance with described implementations.

Traditional systems utilize automatic speech recognition ("ASR") engines to process speech of a user and determine the words spoken by the user. Decoding words by ASR is computationally expensive, especially because a high-quality decoder usually needs a large language model and lexicon and a complex decoding algorithm. Additionally, the words decoded by ASR are not directly used by humans. Instead, words get converted to feature vectors using a large embedding matrix.

As illustrated in FIG. 4, rather than using a complex ASR, the disclosed implementations avoid decoding words and instead use a greedy decoder, such as TensorFlow, to decode the audio to a sequence of spaces and characters. As discussed further below, speech 400 from a user is processed by a greedy decoder to convert the speech into a sequence of spaces and characters 402. For example, if the speech 400 includes the statement "hello world" the decoder converts the speech into the sequence "H E L L O * W O R L D", with * representing a space, as illustrated in block 404. A CED network 406 then processes the characters 404 to determine sentiment data 408 representative of the emotion of the user that generated the speech 400.

Figure 5A:
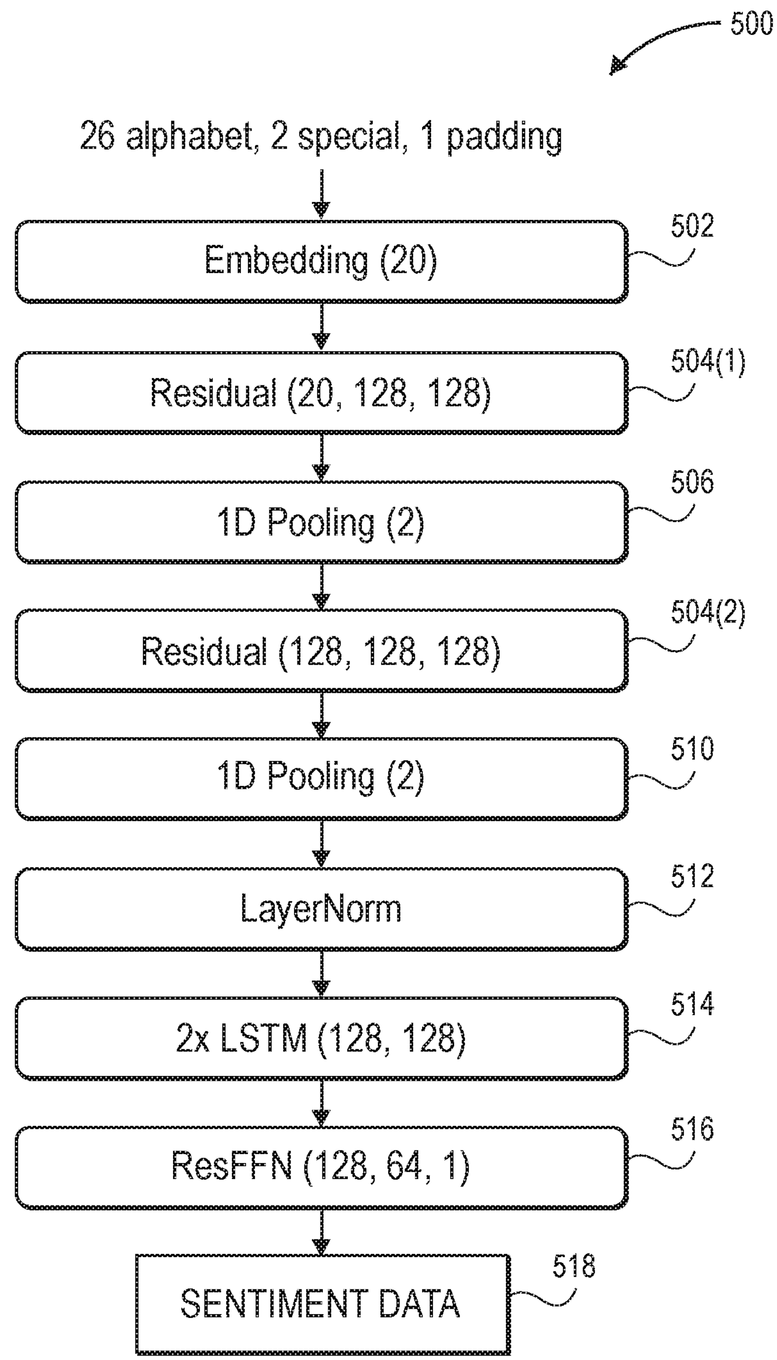
FIG. 5A illustrates a block diagram of a character-level emotion detection network used to convert an input into sentiment data, in accordance with described implementations.

FIG. 5A illustrates a block diagram of a CED network 500 used to convert an input of character data into sentiment data, in accordance with described implementations. The CED network may be any type of neural network, such as a convolutional neural network, deep learning network, etc.

As illustrated in FIG. 5A, the CED network 500 includes embedding layer 502, followed by two residual blocks 504(1), 504(2), a normalization layer 512, two layers of Long Short-Term Memory ("LSTM") 514, and a residual fully connected layer 516. In addition, there are pooling layers 506 and 510 following the residual layers 504(1), 504(2) to reduce the length of the input sequence and the amount of computations. In total, the input sequence length is reduced by a factor of four before the resulting sequence is fed to the LSTM layer 514. The normalization layer 512, which is optional in various implementations, improves the speed of the CED network 500.

As illustrated in FIG. 5A, in some implementations, the CED network 500 may be trained to receive an input sequence of character data that includes a twenty-nine dimensional probability vector—twenty-six alphabet characters, two special characters (space and apostrophe), and a padding character. The embedding layer 502 receives the twenty-nine dimensional probability vector and embeds the vector into a twenty-dimensional space. As is known in the art of neural networks, embedding is a method used to represent discrete variables, such as characters, as vectors of continuous numbers. In this example, the character sequence of input data is converted into an embedding in a twenty-dimensional space.

The embedding is then processed by the first residual layer 504(1) that processes the received embedding as a twenty-dimensional input using a 128-dimensional hidden space that generates a 128-dimensional feature map as the output from the residual layer. The 128-dimensional feature map was selected as the learning capacity of the network to enable the network to operate in environments with limited computing capacity, such as on a wearable device and/or a portable device of a user. In other implementations, the hidden space may be of a different size, such as 256, etc. Processing of the residual layers 504(1), 504(2) is discussed further below with respect to FIG. 5B.

The output, or residual (also known as a feature map), from the first residual layer 504(1) is processed by the first pooling layer 506. The first pooling layer 506, which may be a one-dimensional pooling ("1D pooling"), down samples the residual input received at the pooling layer 506 by summing features of the residual input to reduce the overall length of the input by a factor of two. In the disclosed implementation, with a 128-dimensional feature map as the input, the output from the pooling 506 will be a 128-dimensional pooled feature map with the length halved.

The pooled feature map output from the first pooling layer 506, is provided as an input to the second residual layer 504(2). The second residual layer 504(2) processes the received input, which in this example is a 128-dimensional input using a 128-dimensional hidden space and produces a second 128-dimensional feature map. As noted above, processing of the residual layers is discussed further below with respect to FIG. 5B.

The output of the second residual layer 504(2), in this example, the second 128-dimensional feature map, is again down sampled through a second 1D pooling layer 510. Similar to the first pooling layer 506, the second pooling layer, in this example, down samples the residual input received by the pooling layer 510 by summing features of the residual input to again reduce the length of the input by a factor of two. In the disclosed implementation, with a 128-dimensional feature map as the input, the output from the second pooling 510 will be a 128-dimensional pooled feature map. Through both one-dimensional poolings, the overall length of the input to the network 500 is reduced by a factor of four.

The pooled feature map output from the second pooling layer 510 is processed by a normalization layer 512. The normalization layer 512 removes any outlier data in the pooled feature map. In some implementations, the normalization layer may determine the average mean and remove any data of the pooling layer that is beyond one standard deviation from the average mean. In other implementations, the normalization layer may remove data of the pooling layer that is beyond two standard deviations from the average mean. The output from the normalization layer is a normalized pooled feature map.

The normalized pooled feature map output from the normalization layer 512 is provided as an input to the long short-term memory ("LSTM") layer 514. The LSTM layer 514 is a sequential model that goes over the sequence of the received input and outputs a representation of the sequence. In this example, the LSTM includes two layers that process the output of the normalization layer 512. Upon completion of processing, the LSTM outputs a representation of the sequence as a fixed size 128-dimensional output.

The output of the LSTM layer 514 is provided as input to a residually connected feed forward network ("ResFFN") 516. The ResFFN 516 receives as an input from the LSTM layer a 128-dimensional sequence, has a hidden layer size of 64, and an output size of 1. The ResFFN 516 processes the fixed size sequence from the LSTM layers and produces a single output for each sequence. As discussed above, the sentiment data may be any value in a range of values corresponding to different sentiments and is representative of the emotional state of the user that generated the speech that was converted into character data and processed with the disclosed implementations. For example, the range may be any value between negative-five and positive five, with negative values representing more negative sentiment and positive values representing more positive sentiment. In other implementations, the range may be narrower or wider, all negative, all positive, etc. For example, in other examples, the range may include values between zero and five, with zero representing negative sentiment and five representing positive sentiment.

Figure 5B:
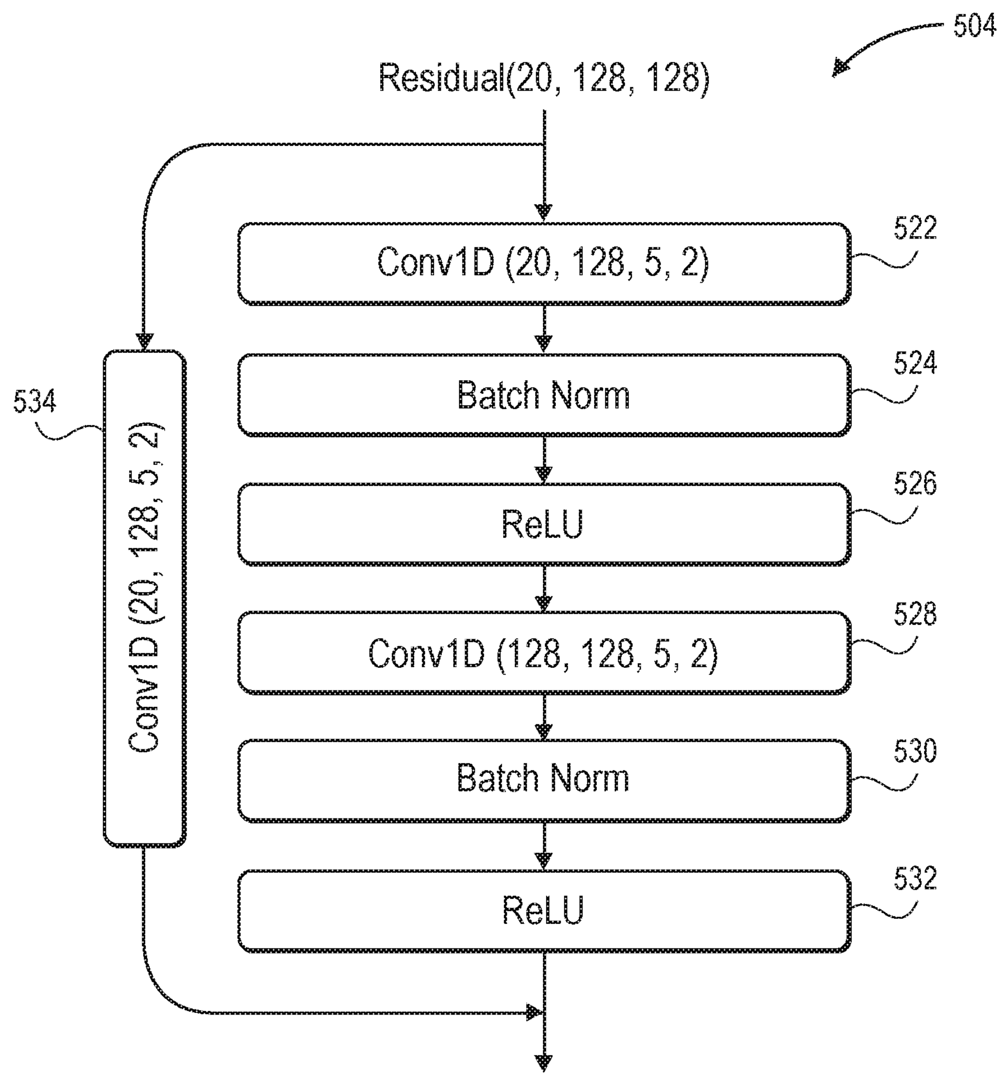
FIG. 5B illustrates a block diagram of residual layers of the character-level emotion detection network of FIG. 5A, in accordance with described implementations.

FIG. 5B illustrates a block diagram of the residual layers 504(1), 504(2) of FIG. 5A, in accordance with described implementations. As is known, the residual layers typically include one or more convolutions, such as convolutions 522, 528, each of which are followed by normalization layers 524 and 530 and activation layers, generally referred to as Rectified Linear Units ("ReLU") layers 526, 532. In the illustrated example, the convolution layers 522, 528 each apply filters having a kernel size of five and a padding of two. In other implementations, the convolution layers may utilize different kernel sizes and/or paddings and those illustrated here are provided only as examples.

Finally, as is known, the residual layer 504 may also include a skip connection 534 that is a convolution included in the residual 504 to ensure that the processing does not get stuck in the nonlinearity of the ReLU layers.

Figure 6A:
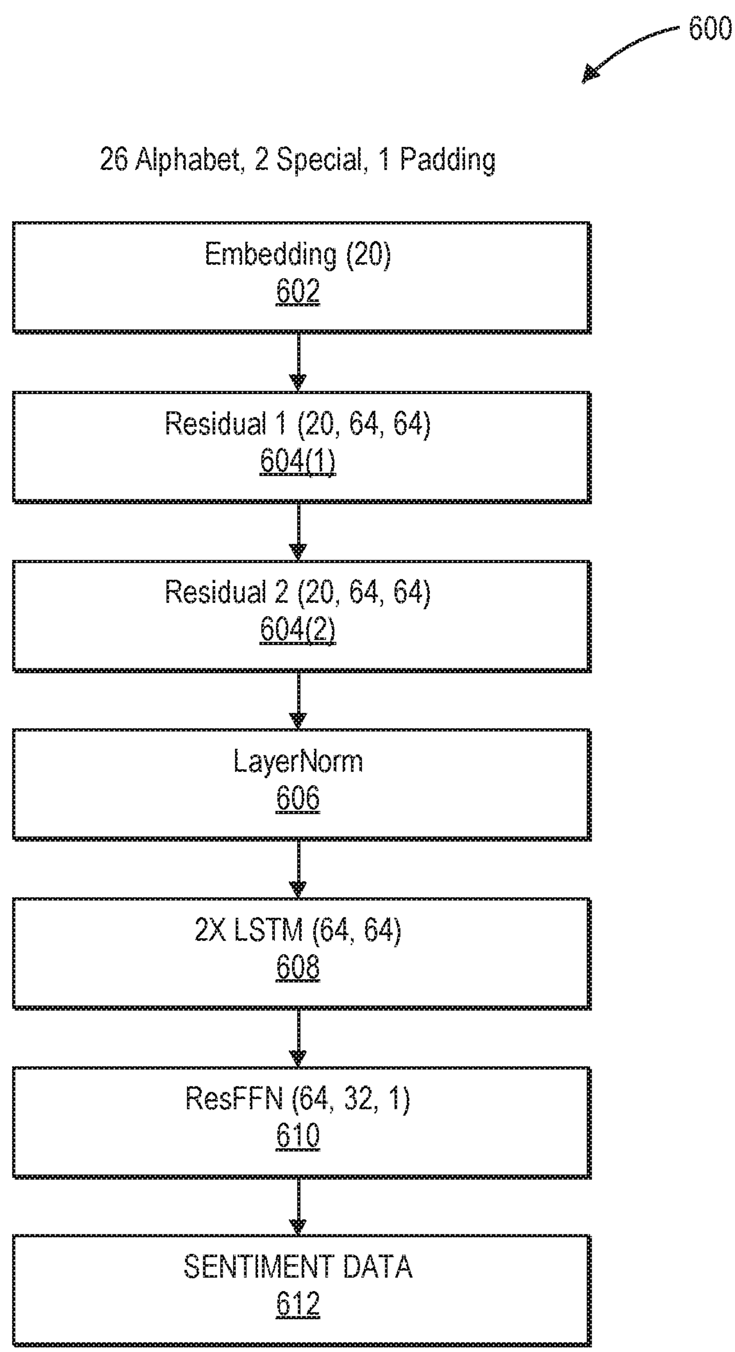
FIG. 6A illustrates a block diagram of another character-level emotion detection network used to convert an input into sentiment data, in accordance with described implementations.

FIG. 6A illustrates a block diagram of another CED network 600 used to convert an input of character data into sentiment data, in accordance with described implementations. In comparison to the CED 500 illustrated in FIG. 5A, the CED 600 includes pooling layers within the residual layers, as discussed further below with respect to FIGS. 6B and 6C. The CED 600 is also more compact with only 64 dimensions.

As illustrated in FIG. 6A, the CED network 600 includes an embedding layer 602 followed by two residual blocks 604(1), 604(2), a normalization layer 606, two layers of Long Short-Term Memory ("LSTM") 608, and an ResFFN 610. In the example illustrated in FIGS. 6A through 6C, the input sequence length is reduced by a factor of eight, due to the pooling layers included in the residual layers, as discussed further below, before the resulting sequence is fed to the LSTM layer 608. The normalization layer 606, which is optional in various implementations, improves the speed of the CED network 600.

As illustrated in FIG. 6A, in some implementations, the CED network 600 may be trained to receive an input sequence of character data that includes a twenty-nine dimensional input—twenty-six alphabet characters, two special characters, and a padding character. The embedding layer 602 receives the twenty-nine dimensional input and embeds the input into a twenty-dimensional space.

The embedding is then processed by the first residual layer 604(1) that processes the received embedding as a twenty-dimensional input using a 64-dimensional hidden space that generates a 64-dimensional feature map as the output from the residual layer. Processing of the residual layer 604(1) is discussed further below with respect to FIG. 6B.

The output, or residual (also known as a feature map), from the first residual layer 604(1) is provided as an input to the second residual layer 604(2), which again processes the input and generates a 64-dimensional feature map as the output from the second residual layer 604(2). As discussed further below with respect to FIGS. 6B and 6C, the first residual layer 604(1) includes two pooling layers that shorten the length of the data in total by a factor of four and the second residual layer 604(2) includes a third pooling layer that again shortens the length of the data such that the length of the output from the second residual layer 604(2) has been shorted by a factor of eight compared to the original input to the CED.

The output of the second residual layer 604(2), in this example, the second 64-dimensional feature map, is processed by a normalization layer 606. The normalization layer 606 removes any outlier data in the feature map. In some implementations, the normalization layer may determine the average mean and remove any data of the feature map that is beyond one standard deviation from the average mean. In other implementations, the normalization layer may remove data of the feature map that is beyond two standard deviations from the average mean. The output from the normalization layer is a normalized pooled feature map.

The normalized pooled feature map output from the normalization layer 606 is provided as an input to the long short-term memory ("LSTM") layer 608. The LSTM layer 608 is a sequential model that goes over the sequence of the received input and outputs a representation of the sequence. In this example, the LSTM includes two layers that process the output of the normalization layer 606. Upon completion of processing, the LSTM outputs a representation of the sequence as a fixed size 64-dimensional output.

The output of the LSTM layer 608 is provided as input to a ResFFN 610. The ResFFN 610 receives as an input from the LSTM layer a 64-dimensional sequence, has a hidden layer size of 32, and an output size of 1. The ResFFN 610 processes the fixed size sequence from the LSTM layers and produces a single output for each sequence. As discussed above, the sentiment data may be any value in a range of values corresponding to different sentiments and is representative of the emotional state of the user that generated the speech that was converted into character data and processed with the disclosed implementations.

Figure 6B:
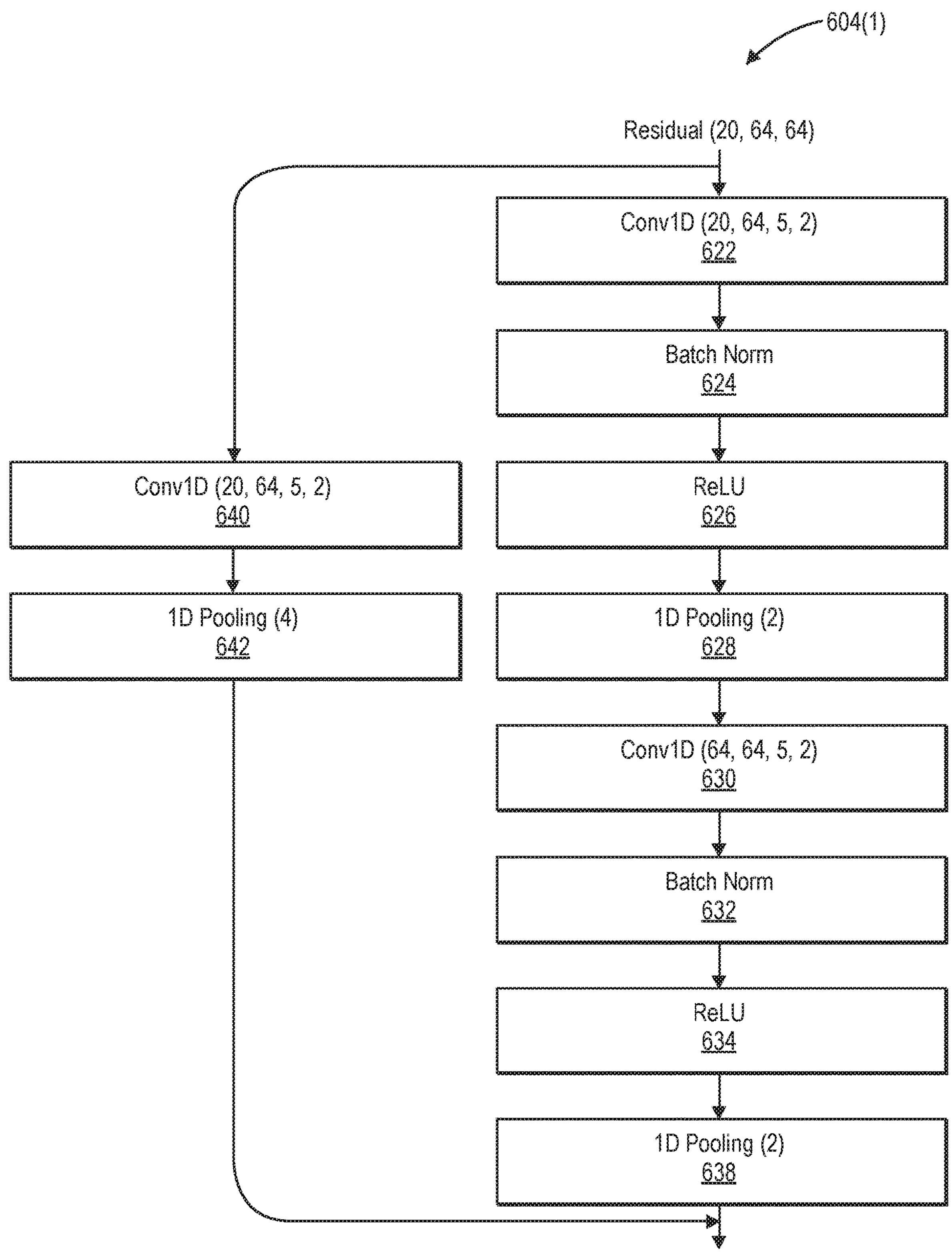
FIGS. 6B and 6C illustrate block diagrams of residual layers of the character-level emotion detection network of FIG. 6A, in accordance with described implementations.
Figure 6C:
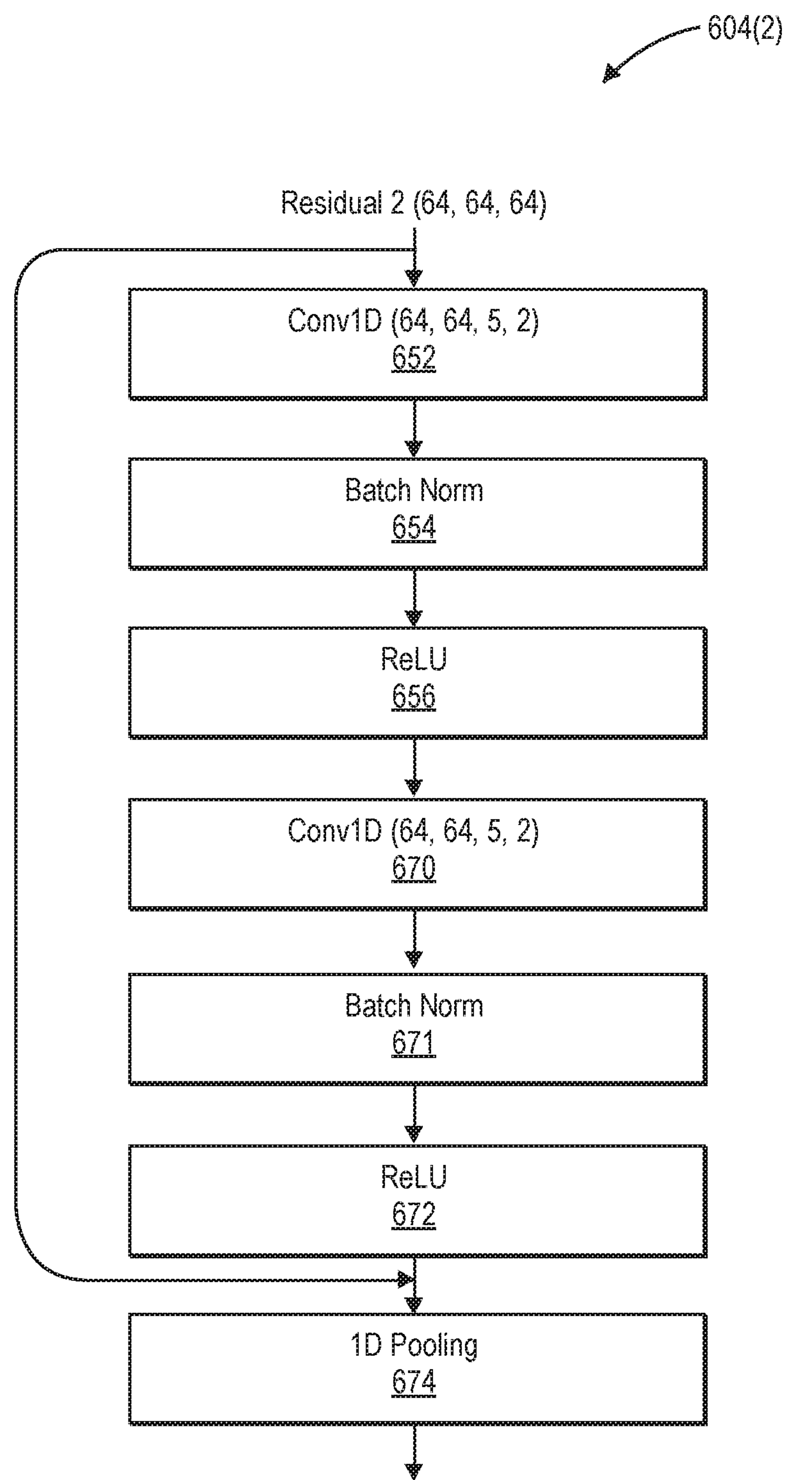

FIGS. 6B and 6C illustrate block diagrams of the first residual 604(1) and the second residual layer 604(2) of the character-level emotion detection network 600 of FIG. 6A, respectively, in accordance with described implementations.

Referring first to FIG. 6B, the first residual layer 604(1) includes one or more convolutions, such as convolutions 622, 630, each of which are followed by normalization layers 624 and 632 and ReLU layers 626, 634. In this example, the residual 604(1) also includes a first 1D pooling layer 628 that receives as input the output of the first ReLU 626. Similar to the 1D pooling discussed above, the pooling layer 628 down samples the input received at the pooling layer 628 by summing features of the input to reduce the overall length of the input by a factor of two. In the disclosed implementation, with a 64-dimensional feature map as the input, the output from pooling 628 will be a 64-dimensional pooled feature map with the length halved compared to the input. Likewise, the second pooling layer 638 receives as input, the output from the second ReLU 634 and processes that input to again reduce the overall length of the input by a factor of two. With both pooling layers in the residual 604(1), the output of the first residual layer has been reduced in length by a factor of four.

Finally, as is known, the residual layer 604(1) may also include a skip connection 640/642 that is a convolution and pooling included in the residual 604(1) to ensure that the processing does not get stuck in the nonlinearity of the ReLU layers.

Referring now to FIG. 6C, illustrated is a block diagram 604(2) of the second residual layer 604(2) of FIG. 6A, in accordance with disclosed implementations.

Similar to the above, in this example, the second residual 604(2) includes two convolutions 652, 670, each of which are followed by normalization layers 654 and 571 and ReLU layers 656, 672. In the illustrated example, the convolution layers 622, 630, 652, 670 of FIGS. 6B and 6C, like the other convolution layers discussed herein, each apply filters having a kernel size of five and a padding of two. In other implementations, the convolution layers may utilize different kernel sizes and/or paddings and those illustrated here are provided only as examples.

Finally, in this example, the output of the second ReLU 672 is provided to pooling layer 674 that processes the data and shortens the length of the input to the pooling layer 674 by a factor of two. As a result, the input to the CED 600 (FIG. 6A) is shortened in length by a factor of eight.

As will be appreciated, the above examples of CED configurations illustrated in FIGS. 5A, 5B, 6A, 6B, and 6C are provided as examples. In other implementations, the CED configurations may be different with a different number of pooling layers and/or a different configuration.

As is known, character-based natural language processing ("NPL") models have recently become popular, especially in the analysis of documents with frequent misspellings. These models are vocabulary-free and able to cope with frequent misspellings in domains such as social media and electronic health records. Character-based NPL models also do not require a large word embedding matrix, resulting in smaller overall model size. Statistically, character-based NPL can generalize better on small datasets because they do not need to disambiguate a large set of words.

In the disclosed implementations, the CED network 500/600 can efficiently process the decoded sequence of characters and extract the emotion content, and a training algorithm based on transfer learning and data augmentation to efficiently train the CED network 500/600. As discussed above, the CED network 500/600 is configured to shorten the input sequence using several pooling operations. Shortening the input sequence reduces the computational cost of the CED network 500/600.

To train the CED network 500/600, sentiment detection using a labeled data set of characters may be utilized. The CED network 500/600 may then be fine-tuned on a transcribed emotion-annotated audio samples. In addition, in some implementations, training and resulting robustness of the CED network 500/600 may be further improved by augmenting character data provided to the CED by randomly changing some of the characters in the input character data.

Figure 7:
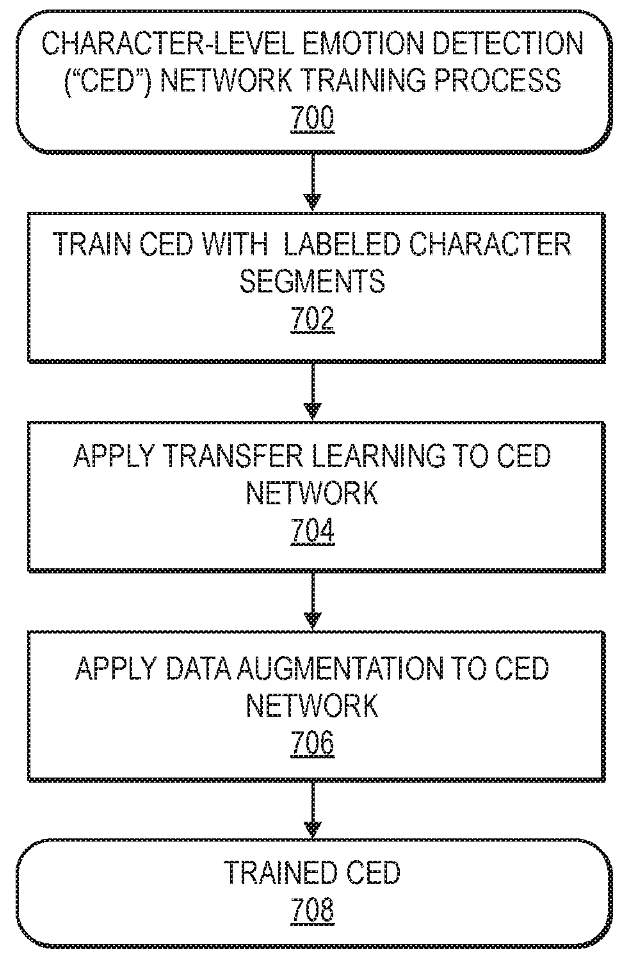
FIG. 7 is an example flow diagram of a character-level emotion detection network training process, in accordance with described implementations.

FIG. 7 is an example flow diagram of a CED network training process 700, in accordance with described implementations. To begin training of a CED network, such as the CED network 500/600 illustrated in FIG. 5A, 6A, the CED network is first trained with labeled character segments, as in 702. For example, one or more public data sets of character based content that includes some form of labels relating to a potential emotional or sentiment of the content may be used. Example public data sets may include, but are not limited to, data sets of public reviews of products that also include some form of rating (e.g., star rating), the Interactive Emotional Dyadic Motion Capture ("IEMOCAP") data set, etc. Training with these data sets is used to predict sentiment scores based on the input character sequences and corresponding labels relating to the character sequences.

In addition to training the CED network with one or more data sets of labeled character segments, in some implementations, transfer learning may also be applied to further refine and train the CED network, as in 704. For example, transfer learning may be used to correlate the similarities between the sentiment scores and emotion detection tasks In addition to transfer learning, in some implementations, data augmentation may be introduced to randomly replace characters of the character sequences input into the CED network to further increase the robustness of the CED network, as in 706. An example of data augmentation is discussed in further detail below with respect to FIG. 8.

With the above process 700, the CED network is trained, as in 708. Training may be done prior to deployment of the CED network as well as periodically or on-going during use of the neural network.

Figure 8:
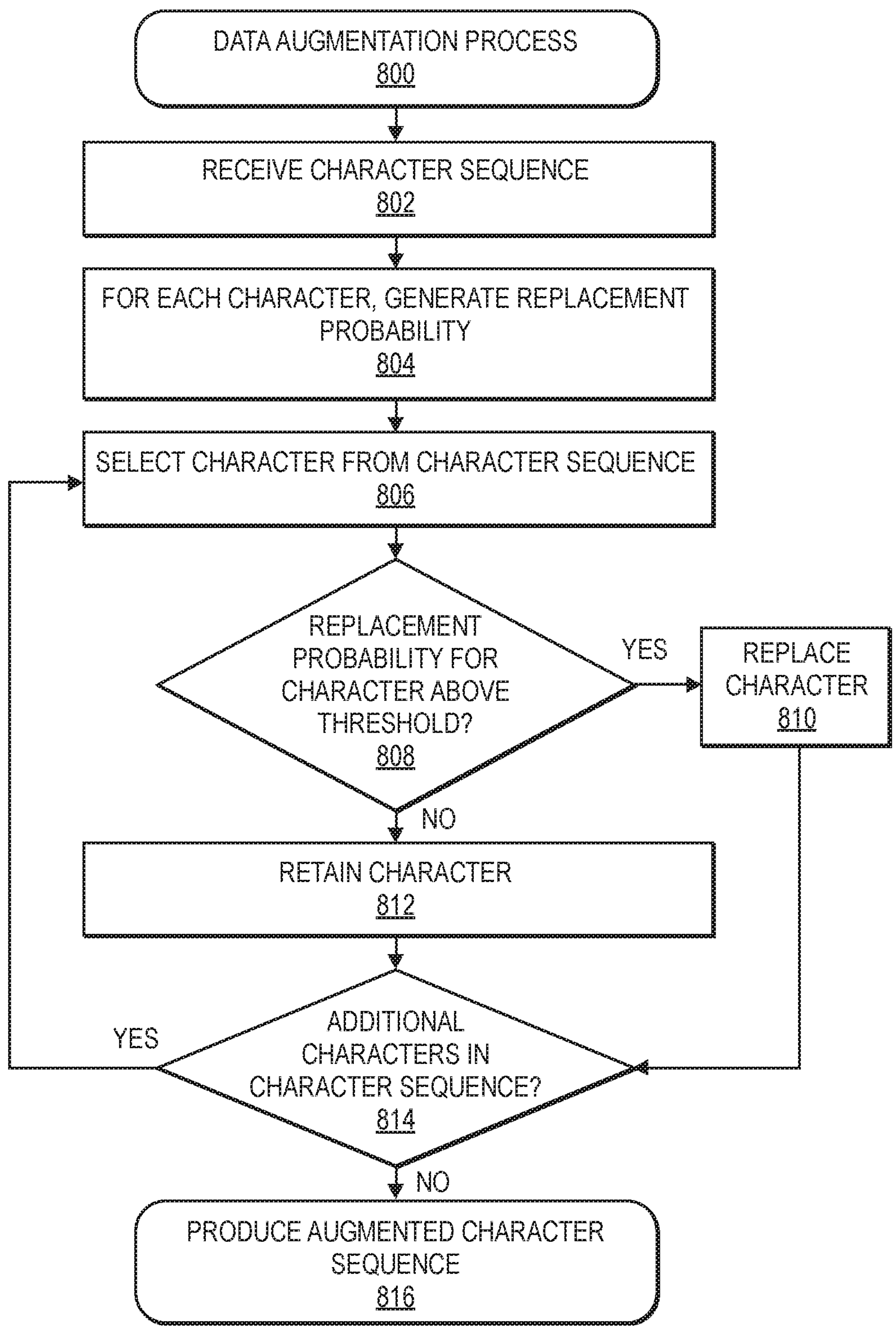
FIG. 8 is an example flow diagram of a data augmentation process, in accordance with described implementations.

FIG. 8 is an example flow diagram of a data augmentation process 800, in accordance with described implementations. In the example illustrated in FIG. 8, the process 800 begins upon receipt of a character sequence, also referred to herein as character data, as in 802. For each character in the character sequence a replacement probability is randomly generated and assigned to the character of the character sequence, as in 804. The replacement probability may be a score or other value indicative of a probability that the character will be replaced.

Upon determining a replacement probability for each character, a character of the character sequence is selected, as in 806. For the selected character, a determination is made as to whether the replacement probability for the character is above a threshold, as in 808. The threshold may be any value or amount.

If it is determined that the replacement probability for the character is above a threshold, the character is replaced with another character, as in 810. The replacement character may be randomly selected from any of the 26 alphabetic characters or the two special characters. If it is determined that the replacement probability is not above the threshold, the character is retained, as in 812.

After either replacing or retaining the character, a determination is made as to whether additional characters in the character sequence remain that are to be processed by the example process 800, as in 814. In some implementations, all characters of a character sequence may be processed by the example process 800. In other implementations, only a percentage of the characters of a character sequence may be processed by the example process 800. For example, in some implementation, only fifty-percent of the characters may be processed.

If it is determined that additional characters are to be processed, the example process 800 returns to block 806 and continues. If it is determined that no additional characters are to be processed, an augmented character sequence is produced that includes the retained characters and the replaced characters, as in 816.

Figure 9:
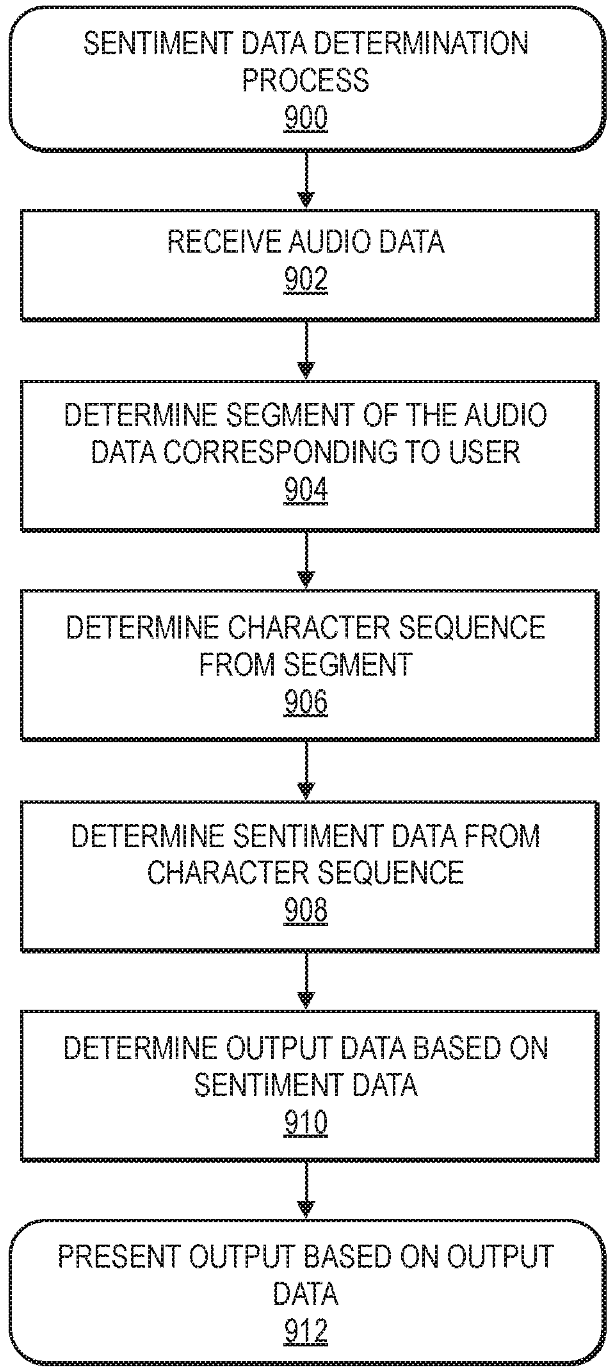
FIG. 9 is an example flow diagram of a sentiment data determination process, in accordance with described implementations.

FIG. 9 is an example flow diagram of a sentiment data determination process 900, in accordance with described implementations.

The example process 900 begins upon receipt of audio data, also referred to herein as speech data, as in 902. For example, as discussed above, a wearable and/or client device of a user may include one or more microphones that receive raw audio within the environment and the received audio generated as audio data. A determination may then be made to determine a segment of the audio data that corresponds to the user, as in 904. For example, and as discussed above, the audio data may be initially processed to remove non-speech audio data (e.g., wind, noises, etc.) and/or to remove speech generated by other individuals that are not the user.

The segment of audio data is then processed to generate a character sequence of characters, also referred to herein as character data, determined from the segment of audio data, as in 906. For example, a greed algorithm may be used to processed the audio data to generate a character sequence without having to use an ASR algorithm to determine the words included in the audio data, thereby reducing the computational cost of processing the audio data.

The CED network discussed above may then process the character sequence to determine sentiment data, as in 908. As discussed, the determined sentiment data is representative of the emotional state of the user when generating the speech that is recorded in the audio data.

Based on the sentiment data, output data may be determined, as in 910. The output data may be any form of output (e.g., audible, visual, haptic, etc.) that may be sent or presented on any one or more devices (e.g., wearable, client device, portable device, smartphone, etc.). For example, the output data may be a user interface that indicates the determined emotional state of the user while generating the speech, a recommendation to the user as to how to alter the emotional state of the user, etc.

Finally, in some implementations, an output produced from the output data may be presented, as in 912.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, energy management, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computing system, comprising:

one or more processors; and a memory storing program instructions that when executed by the one or more processors cause the one or more processors to at least:

receive a goal for a first user;

generate, based at least in part on the goal, a threshold value for use in determining if the first user is achieving the goal;

receive audio data that includes speech;

process the audio data, without determining words included in the speech, to determine a first segment of the speech corresponding to the first user and a second segment of the speech corresponding to a second user;

process the first segment of the speech to determine character data that includes a sequence of characters representative of the speech corresponding to the first user;

process, with a neural network, the character data to produce sentiment data representative of a determined emotional state of the first user;

determine, based at least in part on the sentiment data, that the sentiment data of the first user does not exceed the threshold value corresponding to the goal;

in response to determination that the sentiment data does not exceed the threshold value, determine, based at least in part on the sentiment data and user status data corresponding to the first user, advisory data, wherein the advisory data includes at least:

an indication that the first user is not achieving the goal; and a recommended action that the first user may follow in an effort to achieve the goal;

provide at least a portion of the advisory data for presentation to the first user.

2. The computing system of claim 1, wherein the program instructions that when executed by the one or more processors to process, with the neural network, the character data, further includes instructions that, when executed by the one or more processors, further cause the one or more processors to at least:

process the character data with at least one residual layer of the neural network.

3. The computing system of claim 1, wherein the program instructions that when executed by the one or more processors to process, with the neural network, the character data, further includes instructions that, when executed by the one or more processors, further cause the one or more processors to at least:

normalize, with a normalizing layer of the neural network, an output from at least one pooling layer of the neural network.

4. The computing system of claim 1, wherein the program instructions that when executed by the one or more processors further include instructions that, when executed by the one or more processors, further cause the one or more processors to at least:

pre-train the neural network with labeled character segments; and further train the neural network with data augmentation.

5. The computing system of claim 1, wherein the advisory data includes at least a speech recommendation as to how the first user may manage their speech to change an apparent emotional state of the first user.

6. The computing system of claim 1, wherein the user status data includes data corresponding to a physiological state of the first user.

7. A computer-implemented method, comprising:

receiving a goal for a first user;

processing audio data that includes speech to determine a first segment of the audio data that includes speech by the first user and a second segment of the audio data that includes speech by a second user;

processing the first segment to determine character data that includes a sequence of characters representative of the speech of the first user;

processing, with a neural network, the character data to determine sentiment data indicative of an emotional state of the first user when the first user output the speech;

determining, based at least in part on the sentiment data, that the sentiment data of the first user does not satisfy the goal;

in response to determining that the sentiment data does not satisfy the goal, determining, based at least in part on the sentiment data and user status data corresponding to the first user, advisory data, wherein the advisory data includes at least:

an indication that the first user is not achieving the goal; and a recommended action the first user may follow in an effort to achieve the goal; and providing at least a portion of the advisory data for presentation to the first user.

8. The computer-implemented method of claim 7, wherein the neural network includes:

a normalization layer that processes a second output of at least one of a plurality of pooling layers;

a long short-term memory layer that processes a third output of the normalization layer; and a residual feed forward network that processes a fourth output of the long short-term memory layer and produces sentiment data representative of the emotional state of the first user.

9. The computer-implemented method of claim 7, wherein the neural network includes an embedding layer that processes the character data to produce a first output.

10. The computer-implemented method of claim 9, wherein the neural network includes a first residual layer that processes the first output to produce a second output.

11. The computer-implemented method of claim 10, wherein a pooling layer is included in the first residual layer and reduces a length of the second output.

12. The computer-implemented method of claim 10, wherein the neural network includes a second residual layer that processes the second output to produce a fourth output.

13. The computer-implemented method of claim 12, wherein the neural network includes a second pooling layer that processes the fourth output to reduce a length of the fourth output.

14. The computer-implemented method of claim 13, wherein the neural network includes a normalization layer that processes the fourth output to produce a fifth output.

15. The computer-implemented method of claim 14, wherein the neural network includes a long short-term memory layer that processes the fifth output to produce a sixth output.

16. The computer-implemented method of claim 15, wherein the neural network includes a residual feed forward network that processes the sixth output to produce sentiment data.

17. The computer-implemented method of claim 7, wherein the goal is at least one of a first goal to sound more assertive or a second goal to sound more confident.

18. A character-level emotion detection system, comprising:

a turn detection module configured to process audio data that includes speech to determine a first segment of the speech corresponding to a first user and a second segment of the speech corresponding to a second user;

a character module configured to process the first segment of the speech, without determining words included in the speech, to determine character data that includes a sequence of characters representative of the speech corresponding to the first user;

an embedding layer configured to receive, as an input to the character-level emotion detection system, the character data;

a first residual layer to process the character data to produce a feature map;

a first pooling layer to reduce a length of the feature map and produce a pooled feature map;

a residual feed forward network to process the pooled feature map and produce sentiment data indicative of an emotional state of the first user when the first user output the speech; and an advisory module configured to at least:

process the sentiment data and a goal corresponding to the first user to determine, based at least in part on the sentiment data, that the first user is not achieving the goal; and generate advisory data that includes at least a recommended action that the first user may follow in an effort to achieve the goal.

19. The character-level emotion detection system of claim 18, the system further comprising:

a second residual layer to process the pooled feature map to produce a second feature map; and a second pooling layer to reduce a second size of the second feature map and produce a second pooled feature map.

20. The character-level emotion detection system of claim 19, the system further comprising:

a normalization layer that normalizes the second pooled feature map to produce a normalized pooled feature map.

21. The character-level emotion detection system of claim 20, the system further comprising:

a long short-term memory layer that processes the normalized pooled feature map to produce an output that is received as an input to the residual feed forward network.

22. The character-level emotion detection system of claim 18, the system further comprising:

an output module operable to produce an output that includes information indicating the emotional state of the first user.

23. The character-level emotion detection system of claim 18, the system further comprising:

a voice activity detector configured to process the audio data and determine that the audio data includes the speech.

* * * * *